United States Patent
Babani et al.

(10) Patent No.: US 11,373,000 B1
(45) Date of Patent: Jun. 28, 2022

(54) SYSTEMS AND METHODS FOR MANAGING TOKENS AND FILTERING DATA TO CONTROL DATA ACCESS

(71) Applicant: Akoya LLC, Boston, MA (US)

(72) Inventors: Denis Babani, Malden, MA (US); Asanka Dissanayake, Apex, NC (US); Jeffrey Kukesh, Hingham, MA (US); Anil Mahalaha, Medway, MA (US); Stuart Rubinstein, Fair Lawn, NJ (US)

(73) Assignee: Akoya LLC, Boston, MA (US)

( * ) Notice: Subject to any disclaimer, the term of this patent is extended or adjusted under 35 U.S.C. 154(b) by 0 days.

(21) Appl. No.: 17/452,010

(22) Filed: Oct. 22, 2021

(51) Int. Cl.
*G06F 21/62* (2013.01)
*G06F 3/0482* (2013.01)
*G06F 21/60* (2013.01)

(52) U.S. Cl.
CPC ........ *G06F 21/6227* (2013.01); *G06F 3/0482* (2013.01); *G06F 21/602* (2013.01); *G06F 2221/2141* (2013.01)

(58) Field of Classification Search
CPC ............. G06F 21/6227; G06F 21/0482; G06F 21/602; G06F 2221/2141
USPC .......................................................... 726/5
See application file for complete search history.

(56) References Cited

U.S. PATENT DOCUMENTS

| | | | |
|---|---|---|---|
| 5,179,651 A | 1/1993 | Taaffe et al. | |
| 7,581,014 B2 * | 8/2009 | Mittig | H04L 67/02 709/200 |
| 7,925,554 B1 * | 4/2011 | Sirota | A61K 48/00 705/40 |
| 7,930,487 B1 | 4/2011 | Faibish et al. | |
| 8,156,159 B2 * | 4/2012 | Ebrahimi | G06F 21/62 709/203 |
| 8,612,585 B2 * | 12/2013 | Alstad | H04L 67/142 709/224 |
| 8,966,270 B2 * | 2/2015 | Bu | H04L 63/0823 713/176 |
| 9,025,622 B1 | 5/2015 | Gubser | |
| 9,942,200 B1 * | 4/2018 | Tan | H04L 63/0281 |
| 10,003,591 B2 | 6/2018 | Hockey et al. | |
| 10,104,059 B2 | 10/2018 | Hockey et al. | |
| 10,592,488 B2 | 3/2020 | Haviv et al. | |

(Continued)

OTHER PUBLICATIONS

Hidhaya, S. Fouzul, and Angelina Geetha. "Intrusion protection against SQL injection and cross site scripting attacks using a reverse proxy." International Conference on Security in Computer Networks and Distributed Systems. Springer, Berlin, Heidelberg, 2012. (Year: 2012).*

(Continued)

*Primary Examiner* — Syed A Zaidi
(74) *Attorney, Agent, or Firm* — Haley Guiliano LLP

(57) ABSTRACT

Systems and methods are described for receiving at an intermediary entity a token from a data provider that enables access to a user's data at a data provider, where the token is received without an intermediary entity receiving user credentials. A request is received from a data recipient to receive data from the data provider, where the token is required to access the data. Data may be received from the data provider using the token, and the received data may be filtered based on a data directive associated with the data provider, to identify which data the data recipient is permitted to access. The identified data may be provided to the data recipient.

20 Claims, 17 Drawing Sheets

(56) References Cited

U.S. PATENT DOCUMENTS

| | | | |
|---|---|---|---|
| 10,740,287 B2 | 8/2020 | Haviv et al. | |
| 10,798,100 B1 | 10/2020 | Chu et al. | |
| 10,999,355 B1 | 5/2021 | Chu et al. | |
| 11,032,282 B2 | 6/2021 | Revanur et al. | |
| 2008/0155606 A1 | 6/2008 | Ha | |
| 2009/0103631 A1 | 4/2009 | Jang et al. | |
| 2010/0017608 A1* | 1/2010 | Larsen | H04L 41/12 713/168 |
| 2010/0131720 A1 | 5/2010 | Harper et al. | |
| 2012/0240214 A1* | 9/2012 | Ogura | G06F 21/31 726/12 |
| 2013/0117227 A1 | 5/2013 | Kruglick | |
| 2014/0068637 A1 | 3/2014 | Chen et al. | |
| 2014/0245411 A1 | 8/2014 | Meng et al. | |
| 2014/0279190 A1 | 9/2014 | Severinghaus et al. | |
| 2015/0059003 A1 | 2/2015 | Bouse | |
| 2015/0088981 A1* | 3/2015 | Brousseau | H04L 67/125 709/203 |
| 2015/0262170 A1 | 9/2015 | Bouda | |
| 2015/0356316 A1 | 12/2015 | Thompson et al. | |
| 2017/0221154 A1 | 8/2017 | Eftekhari et al. | |
| 2017/0295159 A1 | 10/2017 | Arora et al. | |
| 2017/0346804 A1* | 11/2017 | Beecham | H04L 67/28 |
| 2018/0054438 A1* | 2/2018 | Li | H04L 63/0876 |
| 2018/0144153 A1 | 5/2018 | Pead | |
| 2018/0144335 A1* | 5/2018 | Vityaz | G06Q 20/351 |
| 2018/0197216 A1 | 7/2018 | Sundhar | |
| 2018/0278624 A1* | 9/2018 | Kuperman | G06F 8/30 |
| 2018/0314726 A1 | 11/2018 | Bath et al. | |
| 2018/0337907 A1 | 11/2018 | Bhansali et al. | |
| 2018/0375863 A1* | 12/2018 | Fan | G06F 21/31 |
| 2019/0138182 A1 | 5/2019 | Kropivny | |
| 2019/0251561 A1 | 8/2019 | Oosthuizen | |
| 2019/0318122 A1 | 10/2019 | Hockey et al. | |
| 2020/0104473 A1 | 4/2020 | Yu et al. | |
| 2020/0204542 A1 | 6/2020 | Nair | |
| 2020/0293185 A1 | 9/2020 | Shedigumme et al. | |
| 2020/0322316 A1 | 10/2020 | Kothavale et al. | |
| 2021/0026982 A1 | 1/2021 | Amarendran et al. | |
| 2021/0027291 A1 | 1/2021 | Ranganathan et al. | |
| 2021/0037032 A1 | 2/2021 | Soeder et al. | |
| 2021/0042764 A1 | 2/2021 | Rungta et al. | |
| 2021/0067507 A1* | 3/2021 | Maruyama | H04L 63/08 |
| 2021/0075613 A1 | 3/2021 | Pandey et al. | |
| 2021/0081439 A1 | 3/2021 | Glickman et al. | |
| 2021/0081947 A1 | 3/2021 | Hockey et al. | |
| 2021/0176234 A1* | 6/2021 | Silverstein | H04L 63/0853 |
| 2021/0216983 A1 | 7/2021 | Glickman et al. | |
| 2021/0288802 A1* | 9/2021 | Muhanna | H04W 12/108 |
| 2021/0288808 A1 | 9/2021 | Bahety | |
| 2021/0397682 A1 | 12/2021 | Guy | |

OTHER PUBLICATIONS

NPL Search Terms (Year: 2022).*
NPL Search Terms (3 items) (2022).
NPL Search Terms (2022) (1 page).

* cited by examiner

US 11,373,000 B1

SYSTEMS AND METHODS FOR MANAGING TOKENS AND FILTERING DATA TO CONTROL DATA ACCESS

INTRODUCTION

This disclosure is directed to systems and methods for managing tokens and filtering data to selectively control access to data. Specifically, techniques are provided for providing a token to a data recipient to enable the data recipient to request user information, and obtaining user information to be sent to the data recipient based on a token received from a data provider. In addition, techniques are provided for filtering data and providing the filtered data to a data recipient based on a data directive associated with a data provider.

SUMMARY

Technological advances in the transmission, storage and processing of digital information has had a profound impact on almost every aspect of life (e.g., commerce, social interactions, internet of things (JOT) technology, etc.). For example, many organizations desire to obtain a consumer's electronic data for a variety of reasons, e.g., to tailor product and service recommendations to the consumer based on the user's interests and past purchases. However, such organizations may provide little or no opportunity for a user to manage his or her data obtained by the organization. In some cases, an organization may, unbeknownst to the user, have an affiliation with a third party that holds information of the user for long periods of time, which may expose the user to security and/or privacy risks with respect to his or her personal information.

As an example, in the context of consumer financial data accessible over the Internet, the practice of screen scraping has long been utilized in which a data aggregator is compensated by a financial services company (e.g., a fintech) to capture a user's login credentials in plain text. For example, a user may have an online account with a financial institution (e.g., a bank) and when the user selects an option to connect his or her account to a fintech, a data aggregator acting on behalf of the fintech may prompt the user to enter his or her log-in credentials for the financial institution. Upon receiving the user's log-in credentials, the aggregator copies and stores the login credentials and uses the captured login credentials to access the user's online bank account and scrape all available account information and store such information, and may continue to scrape data from the user's account even after the request to connect the bank with the fintech is completed. The data aggregator may then share the user's bank account information with the fintech (and possibly other parties), and the fintech may also store such information and present the information to the user once the user has successfully connected his or her bank account to the fintech. In addition to the above-described data privacy concerns associated with screen scraping, the practice of screen scraping may require significant computing resources. For example, screen scraping is computationally intensive and requires significant bandwidth and storage resources for the storage of the scraped data for a large number of users.

In one approach, Application Programming Interfaces (APIs) may be employed as an alternative to screen scraping for financial data access. For example, the bank may receive a user's login credentials and use APIs to provide the required data to an aggregator or directly to the fintech. However, APIs may be difficult to scale; while many financial institutions have negotiated "bilateral" agreements with aggregators and fintechs to use APIs for data access, there are over 10,000 financial institutions in North America and thousands of fintechs. Moreover, APIs face technical challenges (e.g., limited standardization across API specifications and formats), security challenges (e.g., multiple security assessments and scoring methodologies may result in lost time compared to a common vetting and registration process) and legal challenges (e.g., individual bilateral agreements with differing terms may cause expensive and prolonged negotiations). Thus, there is a need for a convenient and secure mechanism for providing a data recipient access to user data associated with a data provider in a manner that avoids one or more intermediary parties having access to and storing the data.

Moreover, while it is often desirable for a data provider (e.g., a bank) to limit how much user data is provided to a data recipient (e.g., a fintech) in response to a user request to share data with the data recipient, it may be difficult or time-consuming for the data provider or other entity to filter through the user data and extract only the data suitable for the request. In one approach, an intermediary entity, upon receiving incoming data, may operate on the entire payload of the data at the byte level to determine which data should be filtered. However, such approach is time-consuming when considered in the context of a number of operations on data such an entity is required to perform. In addition, the intermediary entity often retains any of the information operated on in persistent storage, including confidential and/or personal data of a user. Thus, there is a need for a better technique for filtering user data to ensure that no more data than necessary flows to a data recipient, while at the same time avoiding the practice of permitting unauthorized parties to maintain confidential or personally identifiable information data of a user, e.g., via the practice of screen scraping, and to avoid the aforementioned significant usage of computing resources associated with the widespread practice of screen scraping.

To overcome the above-mentioned problems, systems and methods are provided herein for, in response to receiving a user request to share certain information of the user that is associated with a data provider with a data recipient, employing one or more tokens to ensure each data recipient or data provider is authorized to access and/or provide access to user information data, without providing user credentials to unauthorized or unnecessary parties. In some embodiments, a token may be updated based on additional data recipients being granted access to the user information. In some embodiments, a key-value map data structure may be employed to filter data in accordance with a data directive received from a data provider, to efficiently analyze data received from the data provider and provide only data permitted by the data directive to a data recipient.

In some embodiments, processing circuitry may be configured to receive a request to grant authorization for a data recipient to access user information associated with a data provider, where the request is initiated by a user interacting with a service associated with the data recipient, and in response to receiving the request, re-direct the user from the service associated with the data recipient to an authenticator associated with the data provider, where the re-directing notifies the data provider of the request. The processing circuitry may be configured to receive a first token from the data provider indicating the user has been successfully authenticated by the authenticator, and provide a second token to the data recipient. In response to receiving the second token along with a request for user information from the data recipient, user information data may be obtained from the data provider using the first token and provided to the data recipient.

In some embodiments, the service associated with the data recipient is a web page or application, and the request to grant authorization is received by an intermediary entity, where executable instructions of the intermediary entity are executable to re-direct the user to the authenticator of the data provider. In some embodiments, receiving the first token from the data provider indicating the user has been successfully authenticated by the authenticator comprises: receiving an authorization grant code from the data provider, and in response to receiving the authorization grant code from the data provider, requesting the first token from the data provider. In some embodiments, prior to performing the re-directing, the processing circuitry may be configured to verify the data provider, and determine whether the data recipient, associated with the request to grant authorization, has been authorized by the data provider to access the user information, determine whether the data provider is authorized to provide access to the user information data. In some embodiments, the processing circuitry may be further configured to request, using the first token, a list of accounts or products that the user has with the data provider and receive the list of accounts or products from the data provider. The processing circuitry may be further configured to cause a graphical user interface to be generated for display, where the graphical user interface comprises the list of accounts or products that the user has with the data provider, and a selectable option, for each of the accounts or products, to selectively share with the data recipient information associated with respective accounts or products of the user with the data provider.

In some embodiments, the processing circuitry may be further configured to request, using the first token, a list of accounts or products that the user has with the data provider, and receive the list of accounts or products from the data provider, where the list of accounts or products specifies which accounts or products the data recipient is to be granted access to (which may be different from a list of accounts or products of the user with the data provider that other entities are to be granted access to). In some embodiments, providing the second token to the data recipient comprises generating the second token, wherein the second token is associated with a list of accounts or products that the user has with the data provider to which the data recipient is granted access, generating an authorization grant code associated with the second token, re-directing the user to the data recipient and transmitting the authorization grant code to the first data recipient, and in response to receiving the authorization grant code back from the data recipient, transmitting the second token to the data recipient. In some embodiments, the second token is generated by an intermediary entity and is stored by the intermediary entity without any personally identifiable information of the user, where re-directing the user from the service associated with the data recipient to the authenticator associated with the data provider may comprise providing an indication to the data provider that the intermediary entity is re-directing the user to the data provider on behalf of the data recipient, and the intermediary entity may be transparent to the user within user interfaces provided by the data recipient and the data provider.

In some embodiments, processing circuitry may be configured to receive a first request from a user to grant authorization for a first data recipient to access user information associated with a data provider and a second request from the user to grant authorization for a second data recipient to access user information associated with the data provider. The processing circuitry may be configured to receive an authentication token from the data provider, where the authentication token enables access to user information associated with the data provider, generate a first token for the first data recipient and a second token (e.g., different from the first token) for the second data recipient, and provide the first token to the first data recipient and providing the second token to the second data recipient. In response to receiving the first token along with a request for user information from the first data recipient, the processing circuitry may be configured to obtain user information data using the authentication token and providing the user information data to the first data recipient, and in response to receiving the second token along with a request for user information from the second data recipient, obtain user information data using the authentication token and providing the user information data to the second data recipient.

In some embodiments, processing circuitry may be configured to receive the first request prior to the second request, where the authentication token is received after the first request and prior to the second request, and the authentication token indicates that the first data recipient is granted access to user information associated with the data provider. In addition, an updated version of the authentication token may be received after the second request, where the updated version of the authentication token indicates that each of the first data recipient and the second data recipient is granted access to user information associated with the data provider. In some embodiments, the first data recipient or the second data recipient also acts as a data provider. In some embodiments, an identity token comprising personally identifiable information of the user may be generated and embedded in the first token and the second token.

In some embodiments, the provided systems and methods further comprise identifying, based on an indication from the data provider, that an account or product that the user has with the data provider should not be shared with the first data recipient and the second data recipient, and causing the identified account or product to be omitted from a list of accounts or products provided via the graphical user interface.

In some embodiments, the provided systems and methods further comprise, for each time a new request is received from the user to grant authorization to a new candidate data recipient to access user information associated with the data provider: generating an updated version of the authentication token, wherein the updated authentication token indicates that each of the first data recipient, the second data recipient, and the new candidate data recipient is granted access to user information associated with the data provider; generating a third token for the new candidate data recipient; and in response to receiving the third token along with a request for user information from the new candidate data recipient, obtaining user information data using the authentication token and providing the user information data to the new candidate data recipient.

In some embodiments, processing circuitry may be configured to receive a byte stream from a data provider, and identifying a plurality of data elements of a data record included in the byte stream. The processing circuitry may be configured to transfer the identified data elements to buffer memory, and generate a key-value map to map the identified data elements to their respective memory locations in the buffer memory. The processing circuitry may be further configured to perform, based on a data directive (e.g., received from the data provider) and using the key-value map, filtering of the data elements, and provide the filtered data elements to a data recipient. In some embodiments, the byte stream is generated by converting data from a first format into the byte stream, wherein the first format comprises a plurality of data elements packaged into a data record.

In some embodiments, the buffer memory is a temporary memory to which the filtered data elements are transferred for processing; and the filtered data elements are deleted from the temporary memory in response to performing the filtering. The filtered data elements may not include any personally identifiable information of a user. In some embodiments, the processing circuitry may receive the data directive from the data provider in advance, where the data directive specifies which data elements of the plurality of data elements are permitted to be provided to the data recipient. In some embodiments, the processing circuitry may be configured to receive a plurality of data directives from the data provider for respective data recipients, where each of the plurality of data directives specifies a different combination of data elements that are permitted to be provided to a respective data recipient. In some embodiments, the processing circuitry is further configured to receive user selection of an account of the data provider to provide the data recipient access to, wherein the filtered data elements provided to the data recipient comprise data from the user selected account.

In some embodiments, the processing circuitry may be configured to perform the filtering of the data elements by identifying, using the key-value map, locations in memory of data elements of the data record that match (and locations of data elements of the data record that do not match) permissible data elements specified in the data directive, and delete from memory the data elements of the data record that do not match permissible data elements specified in the data directive. In some embodiments, prior to providing the filtered data elements to the data recipient, the processing circuitry may be configured to convert the data elements to a format suitable for providing the data to the data recipient, which may match the first format from which the data is converted into the byte stream. In some embodiments, filtering of the data elements comprises masking a predefined number of characters of a data element of the identified data elements such that only a subset of the characters of the data element are readable.

In some embodiments, input/output circuitry may be configured to receive at an intermediary entity a token from a data provider that enables access to a user's data at a data provider, where the token is received without the intermediary entity receiving user credentials, and receive a request from a data recipient to receive data from the data provider, where the token is required to access the data. Processing may be configured to receive data from the data provider using the token, filter the received data, based on a data directive associated with the data provider, to identify which data the data recipient is permitted to access, and provide the identified data to the data recipient. Executable code of the intermediary entity may be executable to re-direct the user from respective web pages or applications associated with the data recipient to the provider.

In some embodiments, the processing circuitry may be configured to receive a request from a data recipient to access information from a data provider associated with a user, wherein the request comprises a data recipient token. The processing circuitry may be further configured to validate the request, and in response to validating the request, transmit a secondary token to the data provider. The processing circuitry may be further configured to receive the information from the data provider, generate a package of authorized information based on the information received from the data provider, and transmit the package of authorized information to the data recipient.

In some embodiments, the processing circuitry may be configured to validate the request by: validating the data recipient token; and determining whether the data recipient is authorized by the data provider. In some embodiments, the processing circuitry is configured to transmit the package of authorized information to the data recipient further by: transmitting as the package of authorized information only information from accounts or products of the user with the data provider having been previously authorized by the user for the data recipient. In some embodiments, the processing circuitry is further configured to: identify, based on the information received from the data provider, certain categories of data not permitted to be shared with the data recipient; and remove the identified categories of data from the package of authorized information. In some embodiments, the data recipient token is generated by an intermediary entity; and the secondary token is generated by the data provider in response to authenticating the user. In some embodiments, the processing circuitry is further configured to receive the secondary token from the data provider after the user is authenticated, where the data provider authenticates the user in response to executable instructions of the intermediary entity being executed to re-direct the user from a web page or application associated with the data recipient to the data provider.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
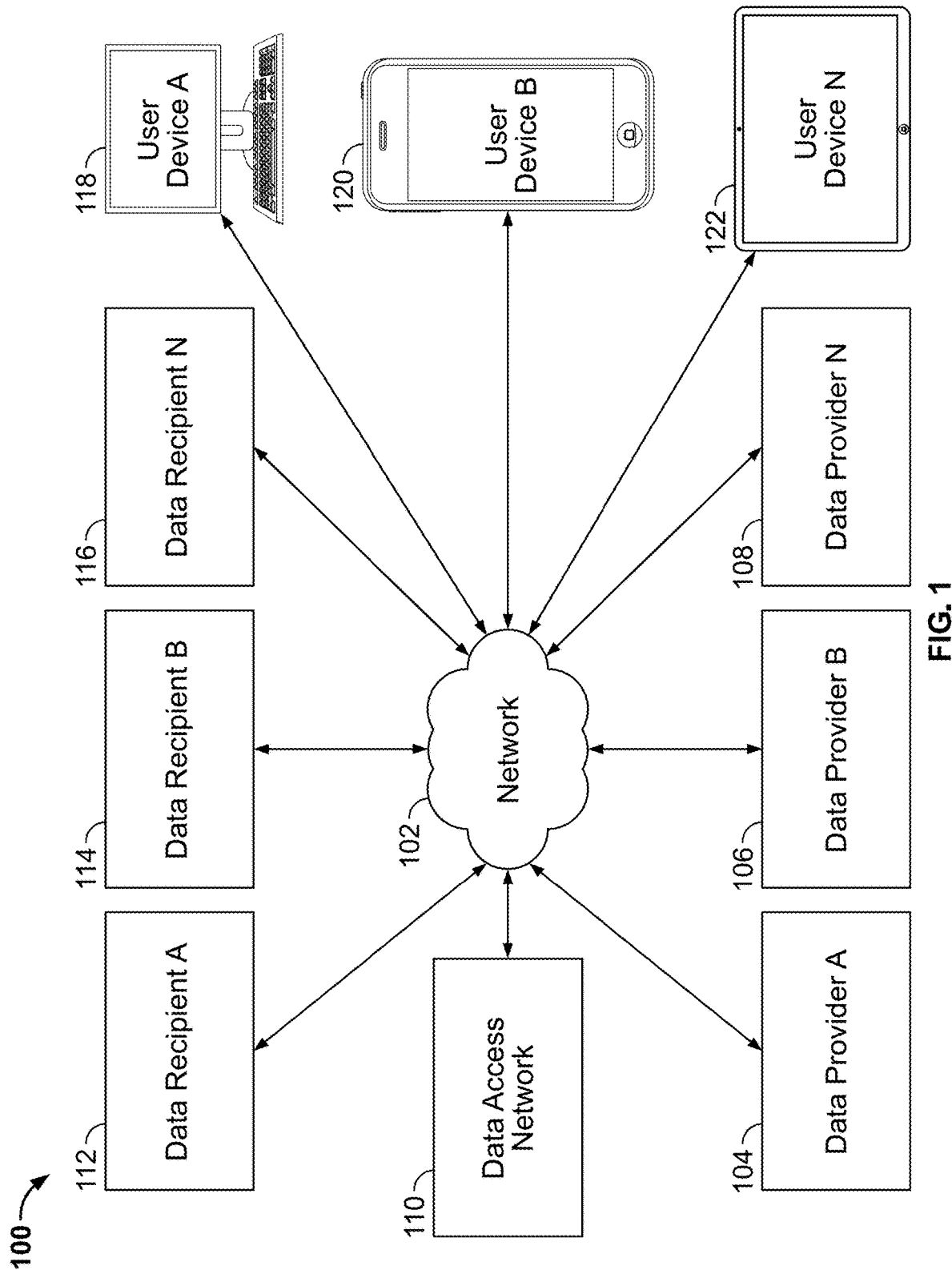
FIG. 1 shows a block diagram of an illustrative system for selectively providing data to a data recipient, in accordance with some embodiments of this disclosure.

FIG. 1 shows a block diagram of an illustrative system 100 for selectively providing data to a data recipient, in accordance with some embodiments of this disclosure. System 100 includes one or more data providers 104, 106, 108 which may comprise servers and/or databases associated with a particular entity (e.g., a financial institution such as, for example, a bank). User devices 118, 120, 122 may be associated with a user (e.g., user 204 of FIG. 2) having an account with, or having purchased products associated with or offered by, one or more of data provider 104, 106, 108. For example, data provider 104 may store information related to a bank account of user 204, that user 204 previously subscribed to with data provider 104. Data access network 110 may be configured to act as an intermediary between data providers 104, 106, 108 and data recipients 112, 114, 116 (e.g., servers and/or databases associated with a financial services company, such as a fintech, an aggregator, RIA platform, payroll processing entity, credit card entity, other banking entity, etc.). Network 102 may comprise any suitable network (e.g., the Internet, including a WAN and/or a LAN) over which data access network 110, data providers 104, 106, 108, data recipients 112, 114, 116 and user devices 118, 120, 122 may communicate. In some embodiments, a particular entity may be capable of taking on a role as both a data provider and a data recipient, depending on the circumstances of a particular transaction or the entities involved in the particular instance. For example, in one instance, data provider 104 may act as a data provider, but in another instance data provider 104 may be configured to act as a data recipient.

Figure 2:
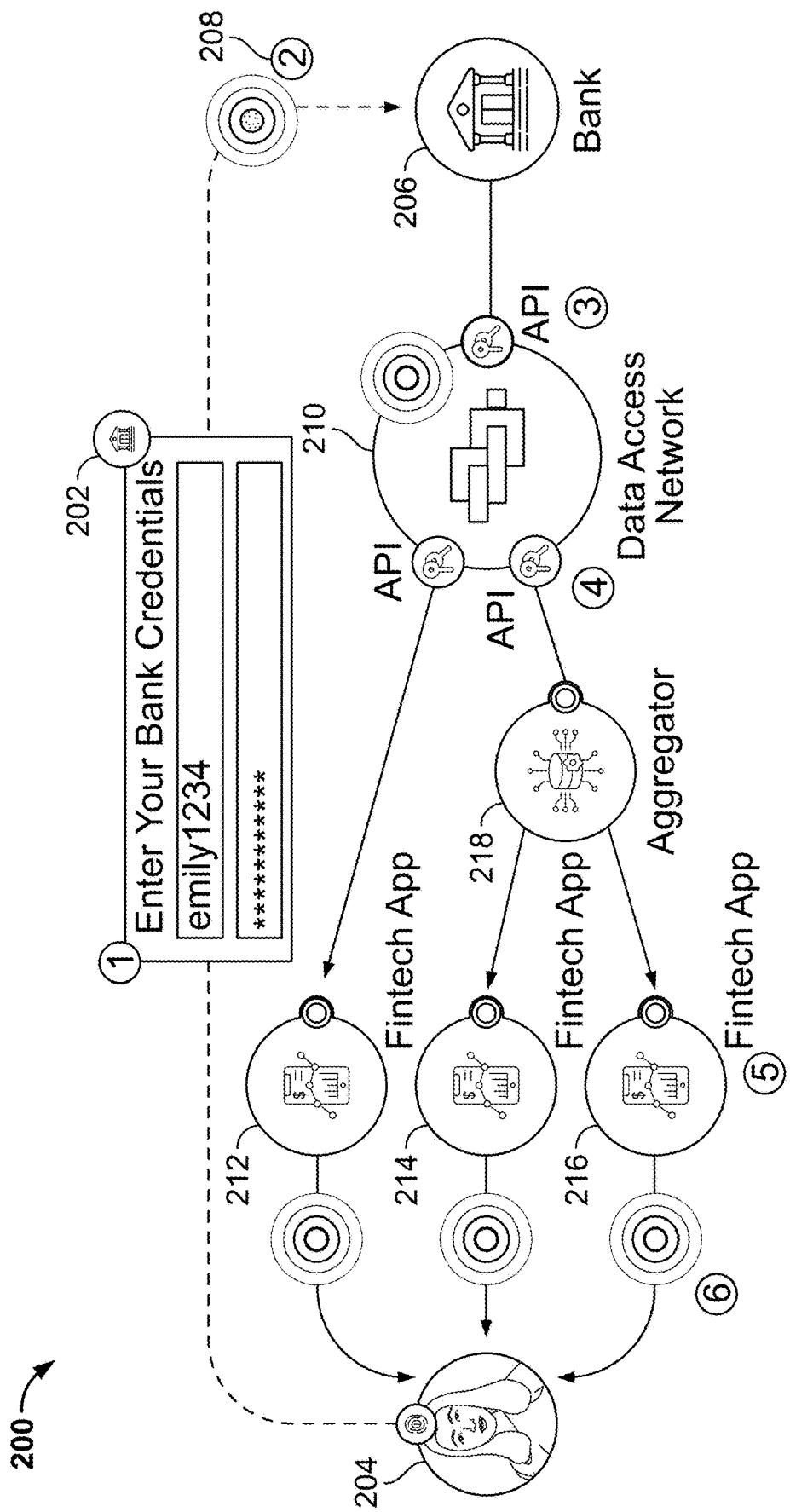
FIG. 2 shows a block diagram of an illustrative system for selectively providing data to a data recipient, in accordance with some embodiments of this disclosure.

FIG. 2 shows a block diagram of an illustrative system 200 for selectively providing data to a data recipient, in accordance with some embodiments of this disclosure. At 202, user device 118, 120 or 122 of FIG. 1, being operated by user 204, may be accessing a website or application associated with data recipient 112 of FIG. 1 (which may correspond to data recipient 212). User 204 may request to link one or more accounts he or she has with data provider 206 to data recipient 212. In some embodiments, data access network 210 (e.g., running at least in part on one or more of data access network servers 702; and/or data provider server 706; and/or user device 705; and/or data recipient server 712 of FIG. 7) may be configured to cause such user request received by data recipient 212 to be forwarded to data provider 206 (which may correspond to data provider 106 of FIG. 1). For example, one or more executable instructions may be provided by data access network 210 to data recipient 212 in order to facilitate re-directing user 204 from the service associated with data recipient 112 to a service associated with data provider 206. For example, data access network 210 (which may correspond to data access network 110 of FIG. 1) may provide code (e.g., contained a URL address) to instruct data recipient 112 how to perform re-directing (e.g., by way of an HTTP instruction to a specified location) of a browser or application being accessed by user 204 to an authenticator service provided by data provider 206. In some embodiments, data access network 210 may perform the re-directing of the user request to data provider 206, upon receiving an indication of the user request from data recipient 212, or data access network 210 may cause data recipient 212 to forward the user request to data provider 206 (e.g., to a particular URL address of data provider 206 specified by data access network 210). In some embodiments, the one or more executable instructions provided by data access network 210 may be running in the background, embedded or otherwise integrated in such data recipient 112 website or application.

Data access network 210 may determine that the user request received by data recipient 212 comprises a request from user device 118 indicating that user 204 desires to share information associated with a user account at data provider 104, which may correspond to a website or an application associated with bank 206) with data recipient 212. In some embodiments, data access network 210 may be transparent to user 204, e.g., from the user experience perspective, the websites or applications user 204 is interacting with remain associated with the data recipient 112 or data provider 104), and such websites or applications may not include an indication of the data access network 210. For example, respective user interfaces provided by data recipient 112 and data provider 104 may not include an indication (e.g., a logo or text or other indicia) of data access network 210.

In response to receiving the request from user device 118 indicating that user 204 desires to share information associated with a user account at bank 206 with data recipient 212, data access network 210 may re-direct user 204 (e.g., accessing the service of data recipient 112 by way of user device 118) to a website or application associated with data provider 206, which may be an authenticator application that prompts user 204 to enter his or her account credentials for the account or profile of user 204 with data provider 104. In some embodiments, the re-directing may be performed by data access network 210 based on a Uniform Resource Identifier (URI) determined by data access network 210 and/or provided by data provider 104 to data access network 210. In some embodiments, prior to re-directing user 204 operating user device 118 (e.g., running a browser or application of data recipient 212) to the website or application associated with data provider 104, data access network 210 may perform a check to ensure that data provider 104 has authorized its users to share information with data recipient 112, and/or a check to ensure that data provider 104 is a recognized data provider of data access network 210. For example, data access network 210 may reference one or more databases (e.g., authorized data provider information database 715 of FIG. 7 and/or authorized data recipient information database 717 of FIG. 7) of authorized data recipients and/or data providers in order to perform this determination. In some embodiments, data access network 210 may generate an intermediary header to be placed at a beginning portion of the re-direct request communicated to data provider 104, to indicate to data provider 104 that data access network 210 is re-directing a user from data recipient 112 to data provider 104, and that there is a user requesting to share his or her data stored at data provider 104 with data recipient 112. In some embodiments, the re-directing performed by data access network 210 to a domain of data provider 206 may be over a front channel (e.g., communicated via a browser or user-facing application at user device 118).

In some embodiments, at 208, the authenticator application of data provider 104 (e.g., bank 206) may perform the authentication of user 204 (e.g., without the involvement of data access network 210), and thus the credentials of user 204 need not be copied or stored externally by data access network 210 or other third parties. Once user 204 is authenticated, permissioned data may be passed by data provider 206 to data access network 210, where data access network 210 and data provider 206 may have previously been configured to accept communications from each other. In some embodiments, data provider 206 and data access network 210 may communicate via an Application Programming Interface (API). As referred to herein, an API should be understood as protocols for defining interactions between, and integrating, two pieces of software (which may have distinct functions) by providing expected requests, conventions, and data formats, enabling entities to interact without requiring knowledge of implementation details. In some embodiments, the Financial Data Exchange (FDX) specifications may be utilized to define the above-mentioned APIs. In some embodiments, the APIs may be RESTful APIs which may request and send data in various formats (e.g., JSON, XML, HTML, etc.). The FDX-based API may be commonly operable amongst a variety of entities. In some embodiments, data access network 210 may determine whether bank 206 is utilizing the FDX API, and the if data access network 210 determines bank 206 is not utilizing the FDX-based API, data access network 210 may convert data received from bank 206 into a format that is compatible with the FDX API.

Figure 5:
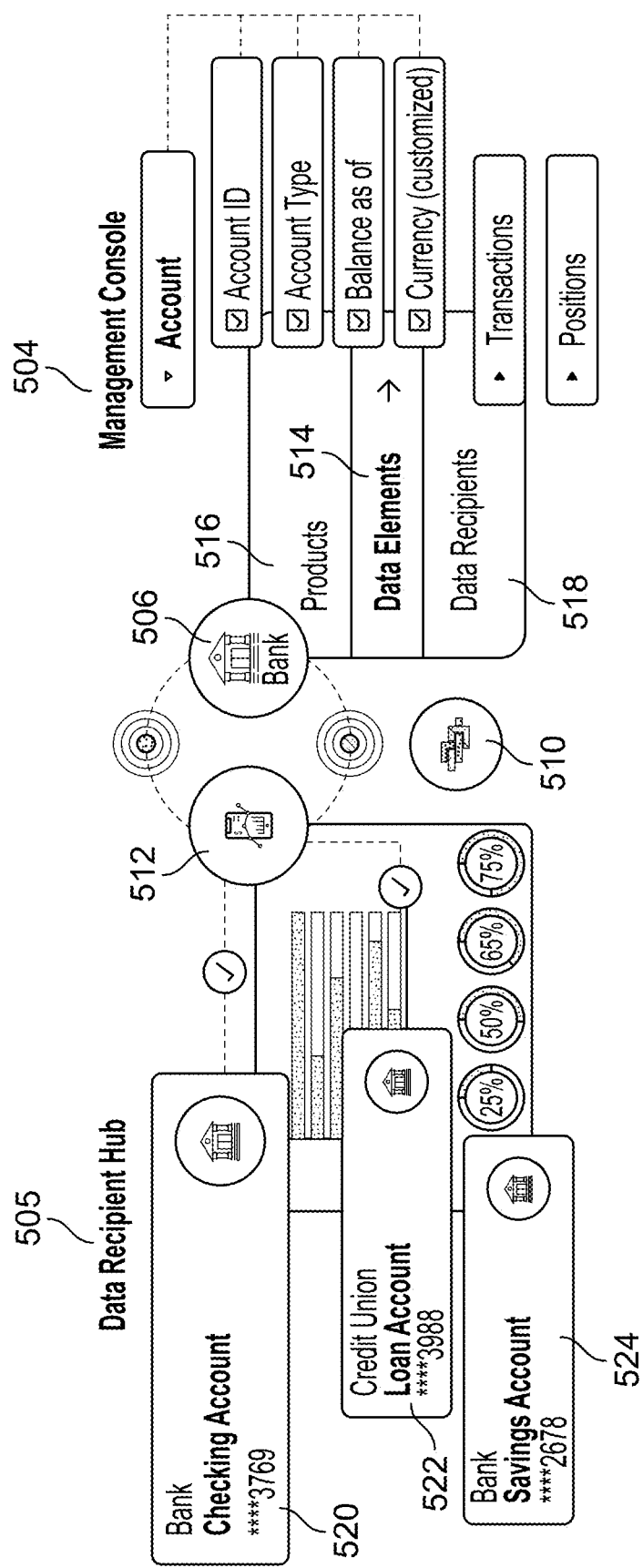
FIG. 5 shows exemplary interfaces provided to data recipients and data providers, in accordance with some embodiments of this disclosure.

Data access network 210 may communicate the permissioned data received from bank 206 to one or more data recipients (e.g., one of fintech app 212, fintech app 214, fintech app 216 and aggregator 218). In some embodiments, data access network 210 may filter the data prior to transmitting the data to a data recipient, such as, for example, in accordance with a data directive (e.g., data directive 808 of FIG. 8) received from, or otherwise generated by data access network 210 at the direction of, bank 206, as discussed in more detail above and below. The data directive may be generated in any suitable manner, e.g., received by data access network 210 from data provider 206; established by data provider 206 by way of management console 504 of FIG. 5 provided by data access network 210; and/or data access network 210 may generate the data directive based on instructions and/or a written agreement between data access network 210 and data provider 206. Thus, in some embodiments, data access network 210 may handle all third-party connections on behalf of bank 206, to enable the data recipient 212 service (e.g., a website or application) to provide the data received from data access network 210 for presentation to user 204. For example, if the information relates to a user's bank account with bank 206, data access network 210 may filter out certain portions of the user's bank account information, and fintech app 212 may present the filtered user information data to the user to enable the user to perform desired actions with his or her information on fintech app 212.

Figure 3:
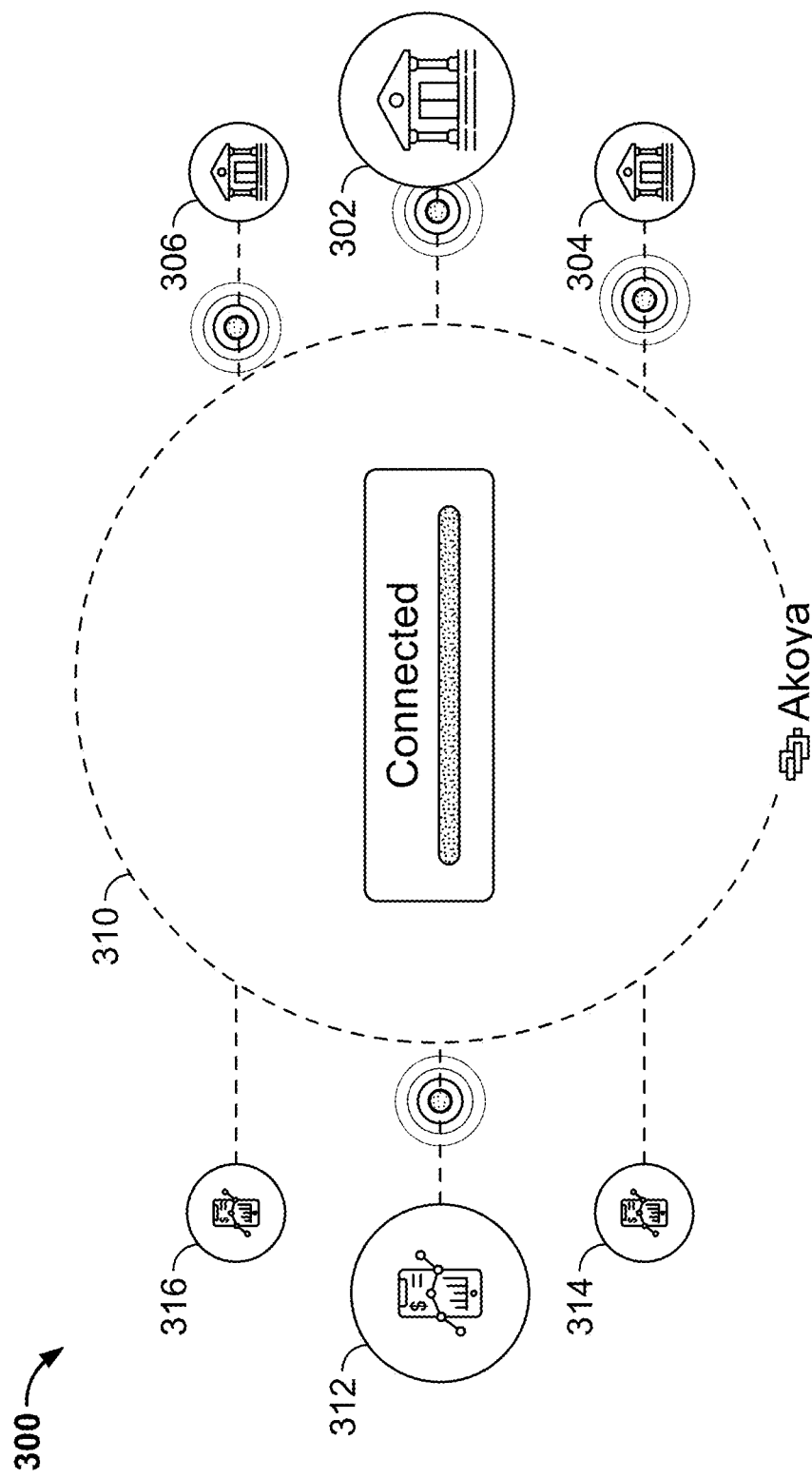
FIG. 3 shows a block diagram of an illustrative system for enabling a data provider to connect to multiple data recipients, in accordance with some embodiments of this disclosure.

FIG. 3 shows a block diagram of an illustrative system 300 for enabling a data provider to connect to multiple data recipients, in accordance with some embodiments of this disclosure. Data access network 310 may enable each of data providers 302, 304, 306 (e.g., a financial institution such as a bank) to connect to one or more of multiple data recipients 312, 314, 316 based on a single integration and implementation of data access network 310. For example, such integration enables data access network 310 to utilize API connections and act as an intermediary between data providers 302 and data recipients 312, 314, 316, to enable data access network 310 to handle all downstream data recipient relationships on behalf of data providers 302, 304, 306, thereby providing reliable and secure FDX-compatible API connections for controlled data sharing between entities. In some embodiments, data access network 310 may provide to data provider 302 communications, e.g., notifications and updates concerning maintenance, data recipient onboarding, and enhancements.

Figure 4:
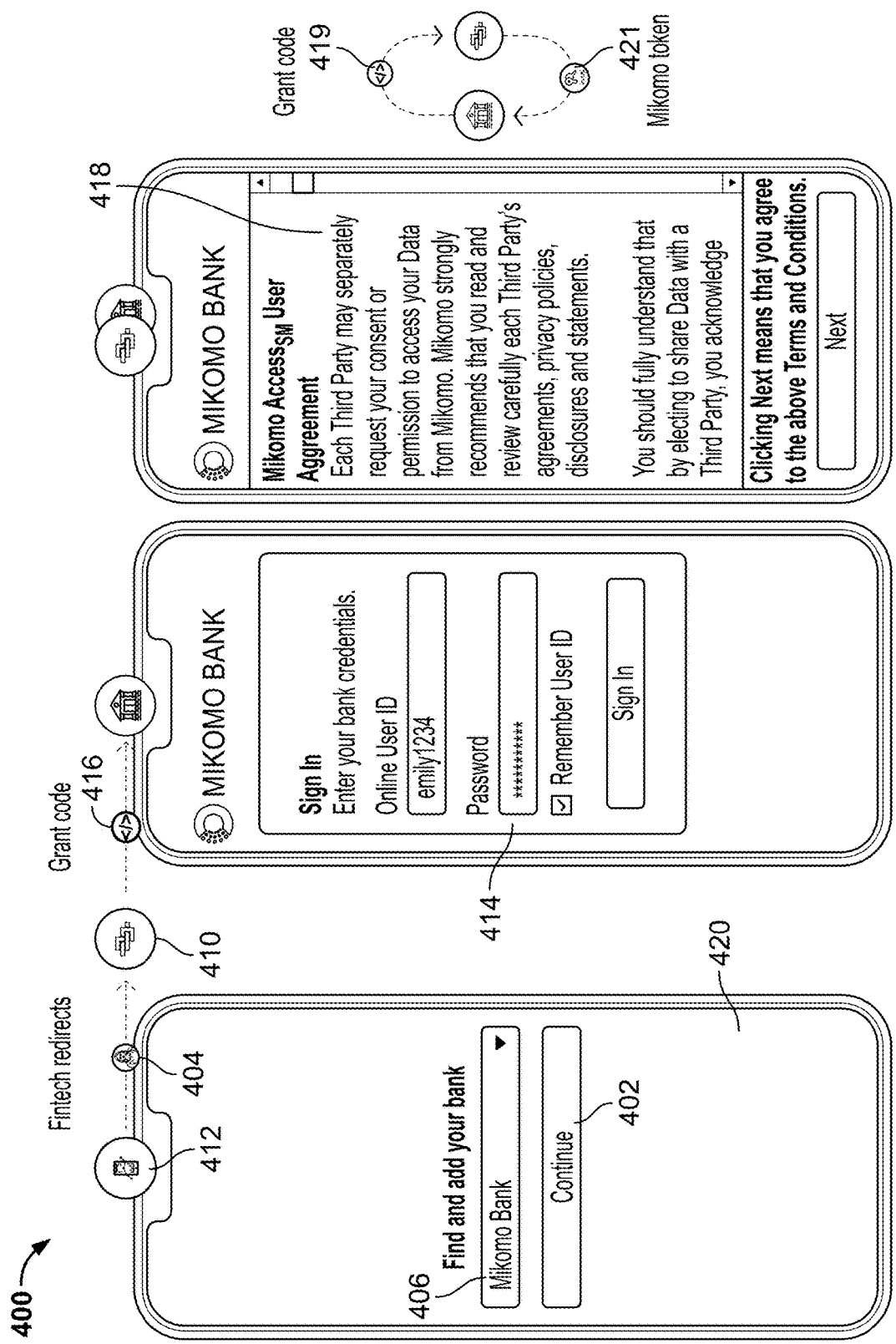
FIG. 4 shows a block diagram of token management system for selectively providing data to a data recipient, in accordance with some embodiments of this disclosure.
Figure 4:
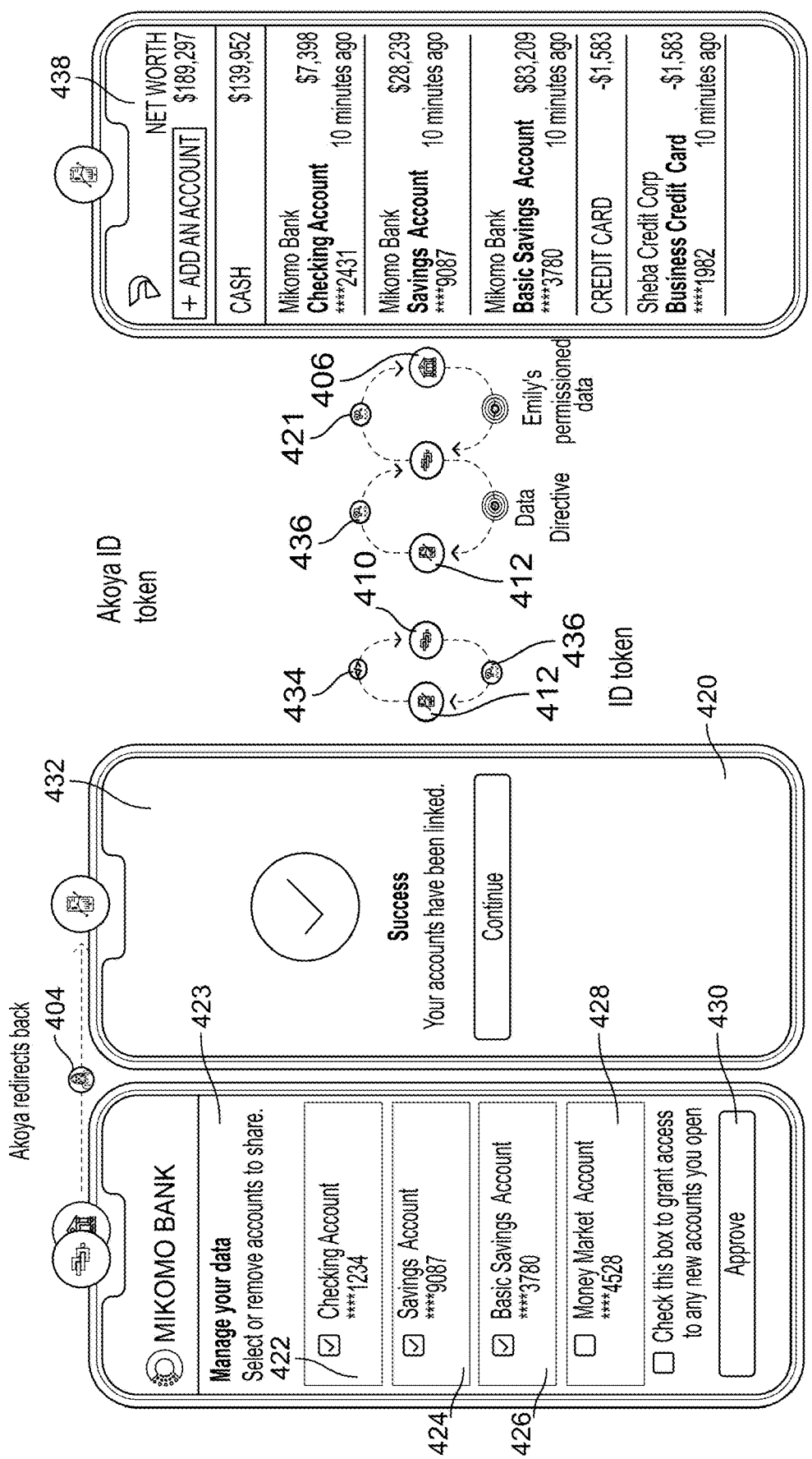

FIG. 4 shows a block diagram of token management system 400 for selectively providing data to a data recipient, in accordance with some embodiments of this disclosure. At 402, user device 420 (e.g., a mobile device, such as, for example, user device 120 of FIG. 1) of user 404 accessing a website or application of data recipient 412 transmits a request to grant data recipient 412 access to a data provider 406 (e.g., Mikomo Bank) with which user 404 has one or more accounts, e.g., checking account 422, savings account 424, basic savings account 426, money market account 428. In some embodiments, the request may contain information regarding the scope of access data recipient 412 is requesting (e.g., specify which accounts of the user's with data provider 406) and/or data access network 410 may store information indicating information typically required by data recipient 412 in connection with users accounts. In some embodiments, the request may contain information regarding a redirect URI (e.g., where to redirect the browser or application being accessed by user 404 to link his or her account with data provider 406 with his or her account with data recipient 412, after the user is authenticated at data provider 406).

In some embodiments, one or more executable instructions may be provided by data access network 410 (e.g., in an address URL) to be executable to redirect user 404 associated with user device 420 to a login interface 414 of a website or application associated with data provider 406. In some embodiments, fintech service 412 may notify data access network 410 of the request to link the accounts of user 404 associated with data provider 406, to enable data access network 410 to process the request. In some embodiments, prior to performing the re-directing, data access network 410 may perform a check to ensure that each of data provider 406 and fintech app 412 is associated with an identifier indicating that such services are validated with data access network 410. Such re-directing may be performed over a front channel, e.g., a browser or application being accessed by user 404 may be re-directed to a domain of data provider 406. In some embodiments, data recipients verified by data access network 410 may by default be permitted to request user information from data provider 406 via data access network 410, e.g., data provider 406 may be provided with an interface (e.g., management console 504 of FIG. 5) to disable certain data recipients that data provider 406 may not desire to provide user information to. Alternatively, data recipients may not be permitted to request user information associated with data provider 406 absent receiving affirmative permission to do so from data provider 406 by way of management console 504 of FIG. 5.

Data provider 406 may authenticate user 404 based on login credentials received from user device 420. In some embodiments, OIDC, OAuth 2.0 alone or in conjunction with Open ID Connect protocols, cookies, and/or SAML protocols may be implemented for authorization and/or authentication. In some embodiments, data access network 410 may be configured to standardize multiple types of the authentication techniques used by multiple data providers into a common format, to enable data recipient 412 (and all other data recipients) to communicate with data access network 410 using a single technique. That is, regardless of an authentication format being employed by a particular data provider that a data recipient is requesting authorization to access user data at, the data recipient may be provided with a standard token format by data access network 410, with which to communicate with data access network 410. In some embodiments, collector 726 may be utilized to perform this standardization, as discussed in more detail below.

Once user 404 is authenticated by data provider 406, data provider 406 may present a user agreement of terms and conditions at interface 418, and data access network 410 may receive from data provider 406 authorization grant code 419 indicating that user 404 has been authenticated and consented to terms and conditions of data provider 406. Such terms and conditions may indicate to user 404 the consequences of permitting a third party (e.g., data recipient 412) access to his or her data with data provider 406. In some embodiments, access network 410 does not receive, along with the indication that user 404 has been authenticated, information regarding the login credentials (e.g., user name and password) entered by user 404 at log-in interface 414 of data provider 406, e.g., data access network 410 is not able to determine personally identifiable information or an identity of user 404. Data access network 410 may transmit authorization grant code 419 back to data provider 406 in order to initiate a request for authentication token 421 from data provider 406. Authentication token 421 may be usable by data access network 410 to obtain a list of products or accounts purchased or subscribed to by authenticated user 404 with data provider 406. Data provider 406 may transmit authentication token 421 to data access network 410 in exchange for authorization grant code 419. In some embodiments, the exchange of authorization grant code 419 and authentication token 421 may occur over a backchannel, e.g., a secure communication channel enabling direct communication between one or more servers (e.g., server 702 of FIG. 7) of data access network 410 to and one or more servers (e.g., server 706 of FIG. 7) of data provider 406, without being transmitted through a browser or user-facing application of user device 420.

In some embodiments, using the received authentication token 421 of data provider 406, data access network 410 may request a product and/or account list of user 404 for selection and transmission to data recipient 412, and cause the product and/or account list of user 404 to be generated for display at graphical user interface (GUI) 423. GUI 423 may be provided by data access network 410 and/or data provider 406 and may permit user 404 to selectively indicate which accounts or products to share with data recipient 412 (e.g., checking account 422, savings account 424 and basic savings account 426) and which accounts or products not to share with data recipient 412 to access (e.g., money market account 428). For example, each account or product may be associated with a selectable option (e.g., check mark) to specify whether a data recipient should be granted access to information associated with that account or product. In some embodiments, in presenting GUI 423, the look and feel, and/or formatting style of data provider 406 may be employed, e.g., even if being hosted by data access network 410. For example, data access network 410 may store stylistic information (e.g., a logo and color scheme for each data provider), and cause display of GUI 423 based on the identified stylistic information of the data provider.

In some embodiments, the website or application associated with data provider 406 may query data access network 410 through APIs to receive and/or transmit information regarding how many and which accounts are selected. For example, data access network 410 may cause, based on receiving an API call from data provider 406, GUI 423 to be generated for display by enabling data provider 406 to generate for display GUI 423 in connection with a webpage or application associated with data provider 406. For example, data provider 406 may provide GUI 423, to enable user 404 to control which or how much data to share with data recipient 412. In some embodiments, GUI 423 may reflect each account user 404 has with data provider 406, e.g., user 404 may have four total accounts with data provider 406 from among each of the accounts or products offered by data provider 406 (e.g., 100 total accounts or products). In some embodiments, GUI 423 may provide an option that enables a user to sign up or purchase new accounts or products from data provider 406, e.g., where selection of such option causes user 404 to be re-directed to an application or website of data provider 406 to subscribe to or purchase new accounts or products offered by data provider 406. For example, upon selecting such option, data provider 406 may present additional account offerings, e.g., a college savings account, that the user does not currently have with data provider 406.

In some embodiments, data provider 406 may determine that information related to certain accounts or products should not be provided to any data recipient. For example, if data provider 406 determines that information related a particular product or account (e.g., an escrow account) should not be provided to any data recipients, an icon associated with such product or account may not be displayed at GUI 423 (or may be displayed as grayed out icon that is not selectable). In some embodiments, data provider 406 may determine that information related to certain accounts or products should not be provided to a particular data recipient. For example, if data provider 406 determines that a particular product account type (e.g., a health savings account) should not be provided to a particular data recipient (e.g., Venmo), an icon associated with such product or account may not be displayed at GUI 423 (or may be displayed as grayed out icon that is not selectable) if user 404 is attempting to link his or her products or accounts with data provider 406 with such particular data recipient. In some embodiments, upon receiving selection at GUI 423 of a particular account from which information may be shared with data recipient 412, such selections may be stored at any suitable data structure (e.g., an authorized accounts selection database), such as, for example, in connection with an account ID.

Once data access network 410 and/or data provider 406 receives selection by user 404 of option 430 of GUI 423 to submit the selected products or accounts, data access network 410 may redirect user 404 back to data recipient 412 e.g., as shown at interface 432 indicating that the user's request to link his or her accounts with data provider 406 with data recipient 412 has been successfully completed. Data access network 410 may additionally generate and transmit to data recipient 412 authorization grant code 434. Authorization grant code 434 may be associated with the indicated accounts and/or products 422, 424, 426 of user 404 with data provider 406 that data recipient 412 has been authorized to access data from. Data recipient 412 may transmit authorization grant code 434 back to data access network 410, e.g., to call the APIs of data access network 410, causing data access network 410 to provide a token 436 (e.g., a first data access identifier token) to data recipient 412 in exchange for authorization grant code 434. In some embodiments, first data access identifier token 436 may be unique to the particular user, data provider and data recipient combination, e.g., a different data recipients linked to the user's accounts with the same data provider may be provided with a different data access identifier token. In some embodiments, authorization grant code 434 may be transmitted to data recipient 412 together when the user is re-directed back to data recipient 412.

In some embodiments, the exchange of authorization grant code 434 and token 436 may occur over a backchannel, e.g., a secure communication channel enabling direct communication between a server (e.g., server 702 of FIG. 7) of data access network 410 and a server (e.g., server 706 of FIG. 7) of data provider 406, without being transmitted through a browser or user-facing application. In some embodiments, one or more of authorization grant code 434 and token 436 may indicate which data categories that data recipient 412 has been permitted by user 404 to access and/or an information regarding when code 434 or token 436 expires. In some embodiments, no personally identifiable information of user 404 is stored in association with, or is represented by, token 436. In some embodiments, data access network 410 may generate an identifier or hash value associated with user 404, without any identifying information. Data access network 410 may cause token 436, and other tokens issued by data access network 410 and/or other entities, to be stored (e.g., at storage 710 of FIG. 7). In some embodiments, token 436 is valid only for data recipient 412 and is recognized by data provider 406 only if received from data access network 410, e.g., if token 436 were to be received by data provider 406 directly from data recipient 412, data provider 406 may refrain from providing user information data to data recipient 412.

Data recipient 412 may use token 436 received from data access network 410 to request from data access network 410 account and/or product details of user 404 with data provider 406 (e.g., by appending or otherwise attaching token 436 to the request). In some embodiments, data recipient 412 may include with the request a re-direct URI indicating a resource location at which data access network 410 may transmit permissioned data to data recipient 412. Data access network 410 may use authentication token 421, received from data provider 406, to request permissioned data associated with accounts and/or products of user 404 with data provider 406. Upon receiving such permissioned data, data access network 410 may reference a data entitlements directive associated with data provider 406, which specifies which data from the permissioned data is permissible to grant data recipient 412 access to. The data directive may have been previously generated by data provider 406 and provided to data access network 410, and/or an updated version of the data directive may be transmitted from data provider 406 to data access network 410 along with the requested permissioned data. Additionally or alternatively, data access network 410 may generate the data directive based on instructions provided by data provider 406.

Data access network 410 may perform filtering of the received data based on the data directive, as discussed in more detail above and below. In some embodiments, the filtered data may be stored in a buffer (e.g., buffer memory 729 of FIG. 7), and deleted from the buffer after being transmitted to data recipient 412 (or in response to determining a data element is not authorized to be sent to a particular data recipient). For example, a particular data recipient may be determined by data access network 410 as unauthorized to receive certain data elements (e.g., based on a data directive associated with data provider 406) and such data elements may be deleted from buffer memory 729 prior to transmitting the filtered data to data recipient 412. In some embodiments, deleting data from buffer memory 729 may correspond to overwriting the data with new incoming data so as to permanently remove, purge, or flush the filtered or unauthorized data from buffer 729 and render the filtered or unauthorized data inaccessible. In some embodiments, the filtered data elements may be deleted immediately after transmission to data recipient 412 or within a predefined period of time after transmission (e.g., any appropriate or suitable amount of time, such as, for example, less than one second; less than thirty seconds; or less than one minute). In some embodiments, deleting the filtered data from buffer memory 729 may correspond to replacing the filtered data with a value indicating the particular data field is eligible to be reallocated for other purposes.

Data access network 410 may transmit the filtered data (e.g., user information data) to data recipient 412 to enable data recipient 412 to present such data via interface 438 at user device 420 of user 404. As discussed, the system of FIG. 4 may enable users to authenticate, select accounts, and permission data to flow from their data provider through the data access network and to a third-party data recipient (e.g., a fintech app), while avoiding sharing with third parties the login information of the user. In some embodiments, upon expiration of one or more of token 421 and 436, user 404 may be required to log-in and/or agree to terms and services at interface 418 to continue sharing permissioned information with data recipient 412.

In some embodiments, data access network 410 may determine that user 404 desires to link his or her account or product information associated with data provider 406 to an additional data recipient (e.g., data recipient 314 of FIG. 3), in addition to data recipient 412. For example, data access network 410 may provide one or more executable instructions (e.g., in a URL address) to an application, website or other service associated with data recipient 314, which may be executable to re-direct user 404 to data access network 410 and/or data provider 406, which may receive a request to share with data recipient 314 account information of user 404 with data provider 406. In some embodiments, data recipient 314 may notify data access network 410 of this request. Data access network 410 may redirect user 404 accessing the website or application of data recipient 314 to log-in at interface 414 provided by data provider 406, and receive an indication from data provider 406 once data recipient 314 has been successfully authenticated and agreed to terms and services of data provider 406 at interface 418. In some embodiments, interface 418 may not be provided to user 404 since user 404 may have previously agreed to the terms and conditions of the user agreement provided by data provider 406.

Data access network 410 may receive from data provider 406 an updated version of token 421 previously received from data provider 406 in connection with granting data recipient 412 access to information of user 404. For example, token 421 may be updated to include an indication that data recipient 314 is now being granted access to at least some of the user information, in addition to data recipient 412. In some embodiments, either data access network 410 or data provider 406 may perform the updating of the tokens. Data access network 410 and/or data provider 406 may use such updated version of token 421 to request user information and present a screen similar to GUI 423, to permit user 404 to specify which accounts or products data recipient 314 is to be granted access to. In some embodiments, data provider 406 may provide GUI 423 to user 404 at user device 420. In some embodiments, data access network 410 may perform the updating of authentication token 421, based on information or instructions received from data provider 406. Such updating of authentication token 421 may be performed by data provider 406 and/or data access network 410 each time a new request is received from user 404 to grant authorization to a new candidate data recipient to access user information associated with data provider 406. That is, authentication token 421 may comprise an indication of each data recipient previously authorized by the user to access user data at a particular data provider 406 (e.g., first data recipient 412, second data recipient 314, any previously authorized candidate data recipients, and the new candidate data recipient). In some embodiments, authentication token 421 may further comprise an identity token associated with a particular user, as discussed in more detail in connection with FIG. 14, which may be employed to transmit PII data to one or more data recipients.

Data access network 410 may receive selections of certain products and/or accounts displayed at GUI 423, and may generate a second data access identifier token associated with data recipient 314 that is distinct from first data access identifier token 436 associated with data recipient 412. That is, data access network 410 may, based on instructions received from data provider 406, maintain and issue separate data access identifier tokens for each of data recipient 412 and data recipient 314, although each of such data access identifier tokens may be associated with requesting access to data of user 404 stored in association with data provider 406. In some embodiments, authentication token 421 is associated only with data provider 406, e.g., a different data provider may be provided with a different authentication token in the event a user desires to link his or her account with such different data provider to a data recipient. In some embodiments, user 404 may specify at GUI 423 that a different set of accounts or products should be provided to data recipient 314 as compared to data recipient 412, and data access network 410 may separately track such differing accounts or products of user 404 with data provider 406 that the respective data recipients have been granted access to.

Data access network 410 may provide the second data access identifier token from data recipient 314, e.g., in exchange for a grant authorization grant code previously transmitted to data recipient 314, and may use the second data access identifier token to request user information of user 404 and associated with data provider 406. In some embodiments, data provider 406 may provide a data directive for data recipient 314 that differs from the data directive for data recipient 412, which may result in data access network 410 performing filtering of user information in a different manner depending on the data recipient. Thus, interface 438 provided by data recipient 314 may provide different information (e.g., user information data) from interface 438 for data recipient 314 (e.g., based on differing use selections at GUI 423 and/or differing data directives for the data recipients). It should be appreciated that data access control network 410 may provide connections between any number of users, data providers and data recipients. In some embodiments, if a data recipient receives an indication from user 404 that its access to user information associated with data provider 406 is being terminated or revoked, the data recipient may notify data access network 410, which in turn may notify data provider 406.

Data access network 410 may employ a data access API based on Financial Data Exchange (FDX) specifications, to enable data recipients to request consumer-permissioned data to flow from a data provider through data access network 410. In some embodiments, through data mapping and API integration, data access network 410 may translate responses from data providers (even those with proprietary APIs) into a common format, enabling expected and standard API responses which may mitigate the need for proprietary APIs, thereby reducing development costs. Exemplary code which may be utilized by the data access API is shown below (e.g., corresponding to interface 438 of FIG. 4):

```
> curl --request GET \
  --url https://akoya.com/akoya/access/fiId/accountsdetails/t1/v1 \
  --header 'akoyaId: akoyaid-test'
> {
  "Accounts": {
    "InvestmentAccount": [
      {
        "accountId": "1755093543",
        "accountType": "CHK",
        "displayName": "Checking Account",
        "nickname": "Checking Account",
        "accountNumber": "*****2431",
        "currency": "USD",
        "balanceType": "ASSET",
        "balanceAsOf": 0,
        "currentValue": 7398.45,
        "availableCashBalance": 7158.96,
        "transactions": [
          {
            "transactionId": "152652715",
            "transactionTimestamp": "1588219200",
            "description": "Megastore",
            "status": "POSTED",
            "amount": -65.98
          },
          {
            "transactionId": "178426915",
            "transactionTimestamp": "1587528000",
            "description": "Coffee Shop",
```

FIG. 5 shows exemplary interfaces provided to data recipients and data providers, in accordance with some embodiments of this disclosure. Data access network 510 may be configured to provide (e.g., via data access network server 110 of FIG. 1, and/or installed at least in part on data provider server 104 of FIG. 1) management console 504 to enable data providers to self-manage their connections and configure their settings in data access network 510, e.g., to review and approve data recipients as well as determine which use cases to present to a given recipient. Management console 504 may include products portion 516 where data provider 506 can manage information (e.g., Account ID, Account Type, Balance as of a certain date, Currency) related to a particular user account that data recipient 512 has been granted access to, a portion 518 regarding data recipients having been granted access to user accounts associated with data provider 506, and products portion 516 identifying products of data provider 506 that one or more data recipients 512 have been granted access to. Data access network 510 may additionally or alternatively be configured to provide (e.g., via data access network server 110 of FIG. 1, and/or installed at least in part on data recipient 112 of FIG. 1) data recipient hub 505 to provide data recipients (e.g., aggregators and/or fintechs) the ability to manage their connection to data providers, such as, for example, data provider 506. For example, data recipient 512 may view information regarding checking account 520, loan account 522, and savings account 524 that data recipient 512 may have been granted access to by a user having such accounts with data provider 406.

Figure 6:
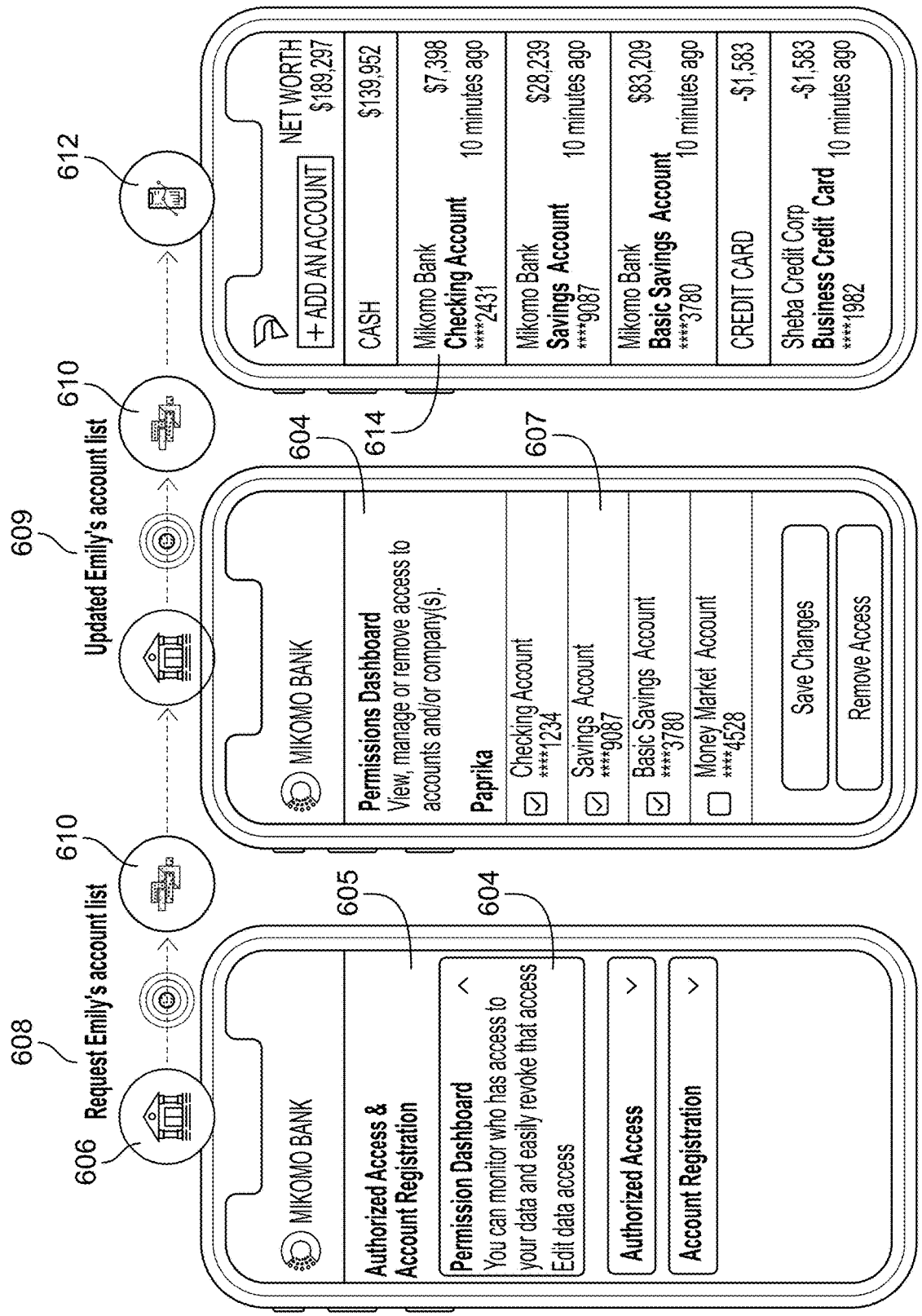
FIG. 6 shows exemplary interfaces provided to users, in accordance with some embodiments of this disclosure.

In some embodiments, management console 504 may enable data provider 506 and/or data access network 510 to revoke access to a data recipient on-the-fly, e.g., upon determining the particular data recipient has been compromised. In some embodiments, management console 504 may enable data provider 506 to specify, or otherwise instruct data access network 510, that data (or requests to access user data stored at data provider 506) should not be sent to data provider 506 (or data recipient 512) at certain times, or only certain data should be sent at certain times. For example, a particular data provider may prefer not to be flooded with data traffic from the hours of 9 AM EST-10 AM EST of a business day, since many users may log into data provider 506 at this time to manage their stock portfolio, and the data provider may communicate this preference to data access network 510. In some embodiments, data FIG. 6 shows exemplary interfaces provided to users, in accordance with some embodiments of this disclosure. In some embodiments, data provider 606 may provide user interface 605 comprising permissions dashboard 604 to an authorized user (e.g., user 204 of FIG. 2) to enable the user to manage which of his or her accounts or providers to grant data recipients access to. In response to receiving a request from the user to access permissions dashboard 604, data provider 606 may, at 608, utilize a permission API (e.g., FDX API) associated with data access network 610 to request permission data from data access network 610, and data access network 610 may in response provide information allowing the user or consumer of data provider 606 to see which data recipients have access to their permissioned data, add new accounts, remove accounts, or remove access overall. For example, permissions dashboard 604 at interface 607 may enable the user to make changes to account selections, e.g., as adding new accounts or removing access to other accounts. In some embodiments, data provider 606 may send, at 609, the updated account information of the user to data access network 610, and data access network 610 may provide the updated information to data recipient 612 having been given permission by the user to access the products or services of the user with data provider 606, e.g., granting or revoking access to certain products or services of the user with data provider 606 based on the user's selections at interface 607.

Figure 7:
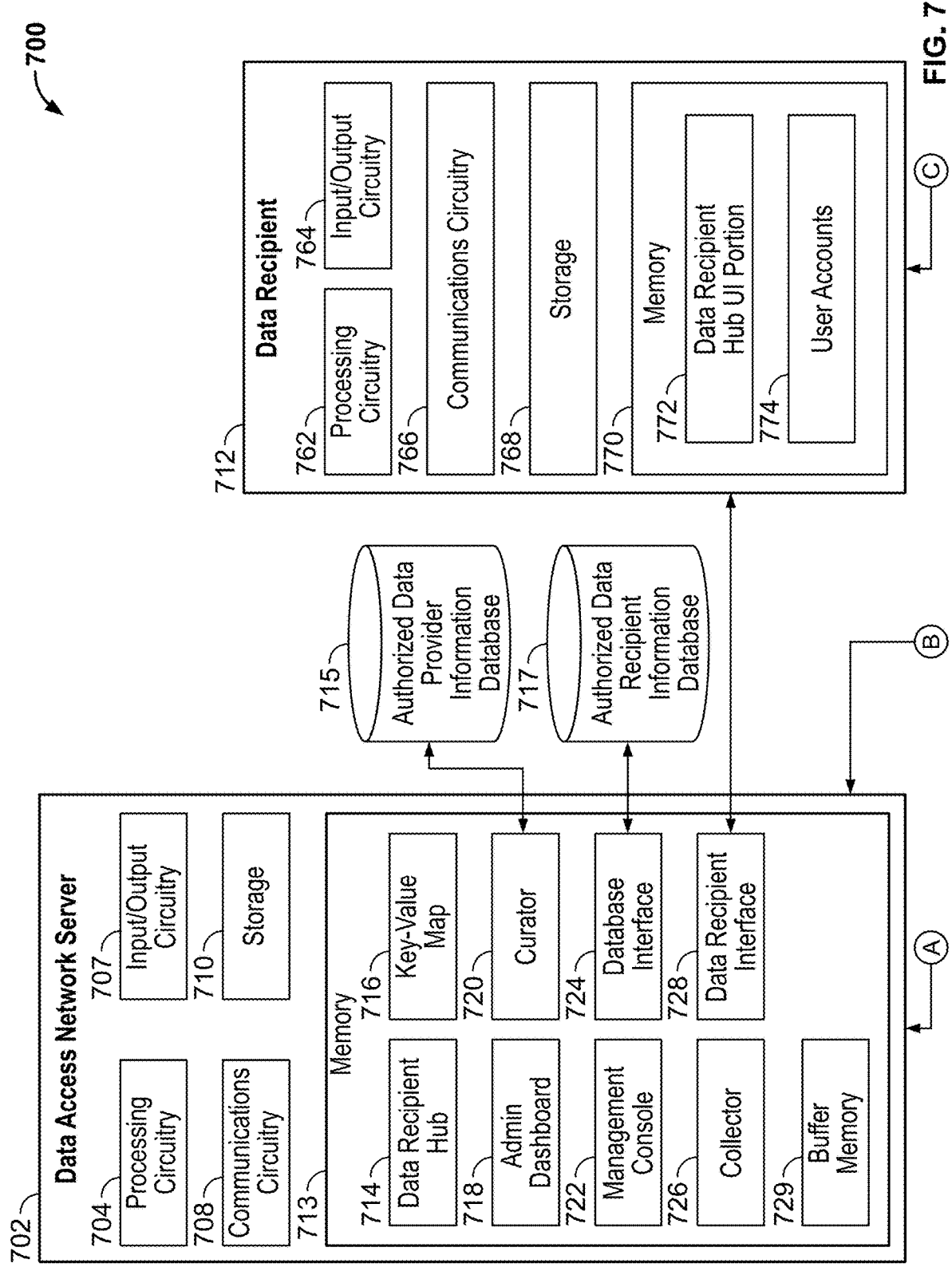
FIG. 7 shows a block diagram of an illustrative system for token management and selectively providing data to a data recipient, in accordance with some embodiments of this disclosure.
Figure 7:
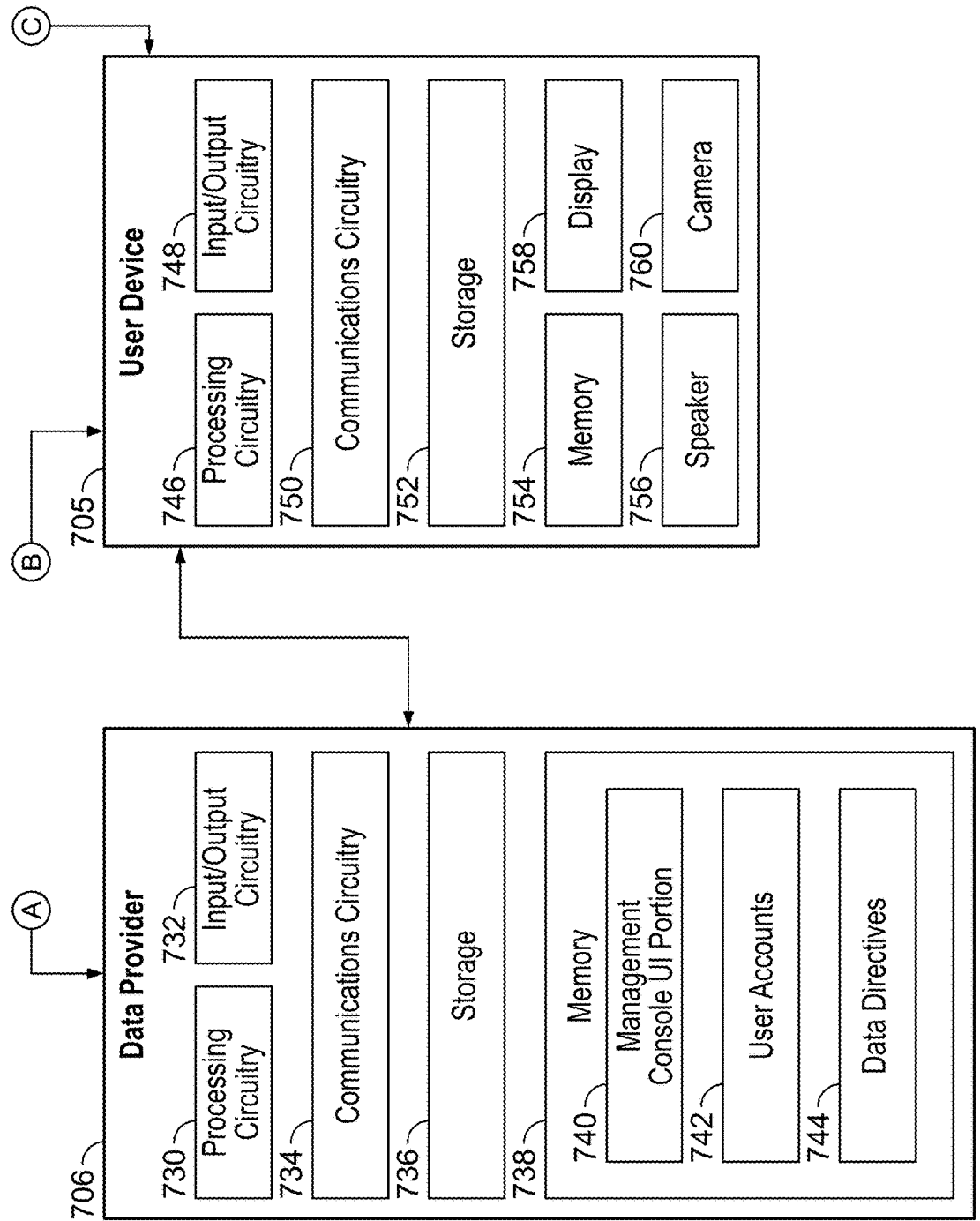

FIG. 7 shows a block diagram of an illustrative system 700 for token management and selectively providing data to a data recipient, in accordance with some embodiments of this disclosure. System 700 may comprise one or more of data access network server 702 (which may correspond to data access network 110 of FIG. 1), one or more of data provider server 706 (which may correspond to data provider server 104, 106, 108 of FIG. 1), one or more of user device 705 (which may correspond to user device 118, 120, 122 of FIG. 1), and one or more of data recipient server 712 (which may correspond to, e.g., data recipient server 112, 114, 116 of FIG. 1). Data access network server 702 may comprise processing circuitry 704 which may comprise hardware, software or any combination thereof, such as, for example, one or more central processing units (CPUs), e.g., a processor, configured to execute non-transitory instructions stored (e.g., encoded) in computer-readable media (e.g., non-transitory memory 713 and/or non-transitory storage 710) to implement operating system(s) and applications of data access network server 702 and perform and/or control various operations on data and other computations. For example, processing circuitry 704 may be configured to execute instructions to implement data access network 110, 210, 310, 410, 510, 610, 810, 910, of FIGS. 1-6 and 8-10. Data access network server 702 may further comprise input/output circuitry 707 and/or communications circuitry 708 configured to receive input (e.g., from an operator or network administrator of data access network server 702), receive communications or requests from, e.g., data provider 706, user device 705, data recipient 712), transmit requests to, e.g., data provider 706, user device 705, data recipient 712, database 715, database 717, and/or output information, e.g., to an operator of network operator or network administrator of data access network server 702. Storage 710 and/or memory 713 of data access network server 702 may comprise one or more of, for example, Random Access Memory (RAM), Read Only Memory (ROM), EEPROM, ASIC, optical storage, magnetic storage, flash memory, solid state memory, or any combination thereof, or any other suitable medium used to store data.

Memory 713 may be configured to store one or more applications executable by processing circuitry 704 to provide one or more of data recipient hub 714, key-value map 716, admin dashboard 718, curator 720, management console 722, database interface 724, collector 726, and data recipient interface 728. Any suitable programming languages may be employed to implement such applications at the backend and/or the frontend, e.g., Java, C, Python, Go, JavaScript (e.g., React library), Typescript, Handlebar, React, etc. Data recipient hub 714 may correspond to data recipient hub 505 of FIG. 5, and may be configured to provide a portal for a data recipient associated with data recipient server 712, such as, for example, by way of data recipient user interface portion 772, to enable data recipients to manage credentials and data access. Key-value map 716, e.g., an associative array or hash table, may generate (based on identified data elements having been transferred to buffer memory 729 by data access network 702) a plurality of key-value pairs, where the key and the value are linked such that the key may be a unique identifier indicative of a location of a data item, and the value corresponds to such data item. In some embodiments, data received from a data provider may be converted into the form of a key-value map to enable efficient retrieval and filtering of data, as is discussed in more detail below. Curator 720 may, in association with authorized data provider information database 715, store authorized data providers (e.g., financial institutions), store products and account offerings associated with the authorized data providers, and manage data recipient subscriptions to data provider products and account offerings. In some embodiments, data recipient 712 may utilize and FDX API call to access elements stored in association with curator 720 and authorized data provider information database 715. Databases 715 and 717 may be implemented using any suitable combination or hardware and software to store and organize data in a structured format, and provide data in response to receiving a query, e.g., from data access network server 702.

Admin dashboard 718 may be configured to enable an operator or administrator of data access network server 702 to monitor elements of system 700 and/or configure settings of data access network server 702. For example, admin dashboard 718 permits logging, auditability, and traceability of data flows within system 700, and admin dashboard 718 permits management of data recipients, data providers and data directives received from data providers, e.g., authorize or remove certain data providers or data recipients, update data directives associated with data providers, manage user accounts and/or user permissions granted. Management console 722 may be configured to provide management console 504 of FIG. 5, which may correspond to management console UI portion 740 of FIG. 7, and may be configured to provide one or more interfaces for data providers to manage which data is made available to which data recipients, e.g., which data directives apply to which use cases and/or users and/or data recipients for a particular data provider.

Database interface 724 may be configured to interface with authorized data recipient information database 717, which may store a record of which accounts each consumer has authorized each data recipient to access. Collector 726 may be configured to be communicatively coupled to authorized data provider information database 715 storing information related to users having accounts or products with the data provider. In some embodiments, each data provider may be respectively associated with one or more databases. Collector 726 may be configured to communicate with data providers, e.g., translate requests or responses received from data providers to an FDX compatible format, e.g., in the event that such requests or responses are received in a format that is not FDX-compliant. In some embodiments, collector 726 may comprise a plurality of collector modules which may be respectively configured for specific data providers, e.g., to convert authentication standards of the respective data providers into a standardized format. In some embodiments, each collector module may contain software specific to a particular data provider (e.g., settings, authentication protocol, and/or other specific software). In some embodiments, each data provider may be associated with a data flow and an authentication flow through a corresponding collector module of collector 726. The respective collector module may utilize whatever APIs the particular data provider is employing to collect data on the fly, and transform the data to the FDX format if the data is not in such format. In some embodiments, collector 726 may be configured to route data through a particular path for a specific data provider, and parallel processing and load balancing techniques may be employed, e.g., if multiple data recipients are requesting data from a particular data provider.

Data recipient interface 728 may comprise an externally facing API for use by data recipients to access permissioned consumer data (e.g., financial data). Memory 713 may include a buffer memory 729 configured to store data in a transitory manner, e.g., to store byte stream 811 and/or user data 804 for a temporary period of time in order to operate and filter user data 804 of FIG. 8. In some embodiments, data access network server 702 may employ an identity provider (IdP) to handle user authentication for data providers and admin dashboard 718. In some embodiments, a third party service may be utilized (e.g., data recipients may utilize Amazon Web Services (AWS) Cognito for their IdP). In some embodiments, an abstraction layer may be provided by data access network server 702 for interaction with the data recipient user accounts (e.g., at AWS Cognito), roles, and/or email sending via a third party service (e.g., AWS SES). In some embodiments, data access network server 702 may provide a permissions API, which may be an externally facing API for data providers to build their own consumer permission management dashboards against. In some embodiments, access network server 702 may provide an interface to handle end user authentication workflows (e.g., to perform a handoff to the correct data provider for authentication). In some embodiments, role based permissions may be utilized, e.g., to restrict access by data recipients to unauthorized information. In some embodiments, data access network server 702 may employ security provisions, e.g., a Least Privilege Zero-Trust Model, secure application development implementing DevSecOps, NIST and FFIEC frameworks, to ensure data is secure, and data access network server 702 may employ each of in-flight and at-rest encryption to ensure data is secure.

Data provider server 706 may comprise processing circuitry 730, input/output circuitry 732, communications circuitry 734, storage 736 and memory 738, which may be implemented in a similar manner as processing circuitry 704, input/output circuitry 707, communications circuitry 708, storage 710 and memory 713, respectively, of data access network server 702. Data provider server 706 may be communicatively coupled to data access network server 702, user device 705 and data recipient 712. For example, data provider server 706 may be associated with a financial institution such as, for example, a bank, that permits users to access their accounts to view information related to their account and subscribe to new products (e.g., a checking account). Processing circuitry 730 may be configured to execute instructions stored in memory 738 and/or storage 736 to provide management console UI portion 740, user accounts 742 and directives 744. Management console UI portion 740 may be installed at, or otherwise provided to, data provider server 706, which may correspond to management console 504 of FIG. 5, and which may be configured to provide data providers with the ability to view information related to products to self-manage their connections and configure their settings in connection with data access network 702, e.g., to review and approve data recipients as well as determine which use cases to present to a given recipient. In some embodiments, management console UI portion 740 may enable data providers to specify which data directives 744 are to be applied to certain use cases and/or certain users and/or certain data recipients, and may enable data providers to monitor which data recipients have been granted access to which user information stored in association with data provider 706. For example, management console UI portion 740 may permit an operator or administrator of the data provider to log in and configure data elements to be sent to certain data recipients. In some embodiments, management console UI portion 740 may allow a provider to view data transmission in real time, including system logs and flow volumes. As used herein, data elements may be understood as any suitable combination of products (e.g., offered by data providers) and/or accounts (e.g., which may be products subscribed to by a user, and may be viewed by and selectable at GUI 423 of FIG. 4). For example, a product may be a mortgage, a checking account, a savings account, etc., and data elements related to the product may comprise an account number, an account balance, an interest rate, etc.

In some embodiments, data provider server 706 may provide information to, and update information stored at, authorized data provider information database 715. Data provider server 706 may store information related to user accounts 742, such as, for example, which accounts or products of the data provider that a particular user is subscribed to or has with the data provider. In some embodiments, data provider server 706 may be configured to provide to user device 705 a permissions dashboard 604 and receive an indication from user device 705 of which accounts or products that a data recipient is to be granted access. In some embodiments, the data access network application is transparent to a user accessing a website or application provided by data provider server 706 (e.g., logos or other indicia of the data access network application may be omitted from user interfaces provided by data provider server 706). Data directives 744 may be set by data provider 706 for a particular data recipient 712. For example, data provider 706 may indicate that data recipient 712 should not receive account balance information, and data provider 706 may provide a data directive indicating this information to data access network 702, which may implement the data directive by filtering out certain data, when a user requests data that implicates the data directive, as discussed in more detail below.

User device 705 may comprise processing circuitry 746, input/output circuitry 748, communications circuitry 750, storage 752 and memory 754, which may be implemented in a similar manner as processing circuitry 704, input/output circuitry 707, communications circuitry 708, storage 710 and memory 713, respectively, of data access network server 702. User device 705 may be communicatively coupled to data access network server 702, data provider server 706 and data recipient server 712. In some embodiments, user device 705 may correspond to a device of user 204 of FIG. 2, having requested to link a data provider to a data recipient, and may be used by user 204 to communicate which accounts or products that the user has with data provider 706 which data recipient 712 is to be granted access. User device 705 may also be an example of a device used by an administrator or operator of data provider 706 to configure settings or view which data recipients have been granted access to which users of data provider 706, and/or by an administrator or operator of data recipient 712 to configure settings or view which data providers and which users of the data providers data recipient 712 has been granted access. User device 705 may comprise display 758, e.g., to present information to user 204 or administrators of data provider 706 or data recipient 712, speaker 756, e.g., to output audio alerts regarding the data access network to the user, and camera 760, e.g., to permit the user to capture images of the surrounding environment, or receive login credentials by way of biometric data. Input/output circuitry 748 may be configured to receive login credentials by way of any suitable method, e.g., text, audio, tactile, or any combination thereof.

Data recipient 712 server may comprise processing circuitry 762, input/output circuitry 764, communications circuitry 766, storage 768 and memory 770, which may be implemented in a similar manner as processing circuitry 704, input/output circuitry 707, communications circuitry 708, storage 710 and memory 713, respectively, of data access network server 702. Data recipient server 712 may be communicatively coupled to data access network server 702, data provider server 706 and user device 705. Data recipient 712 may be associated with an entity (e.g., a fintech company) that provides certain services (e.g., mobile payments) which require having access to a user's data (e.g., data related to a bank account of user 204, in order to obtain funds for the mobile payments). In some embodiments, an application provided by data access network server 702 may provide one or more executable instructions (e.g., contained in a URL address) to data recipient server 712, to instruct data recipient server 712 to notify data access network server 702 when a user request is received by way of the URL, e.g., to link a bank account of the user to a website or application associated with data recipient 712. Data recipient hub UI portion 772, which may correspond to data recipient hub 505 of FIG. 5, may be installed at, or otherwise provided to, data recipient 712 by data access network server 702, and may permit an administrator or operator of data recipient server 712 to view data provider and user pairs that data recipient server 712 has been authorized to access. User account portion 774 may store information regarding users having registered with data recipient 712 and data providers associated with the user that data recipient 712 has been granted access to.

Figure 8:
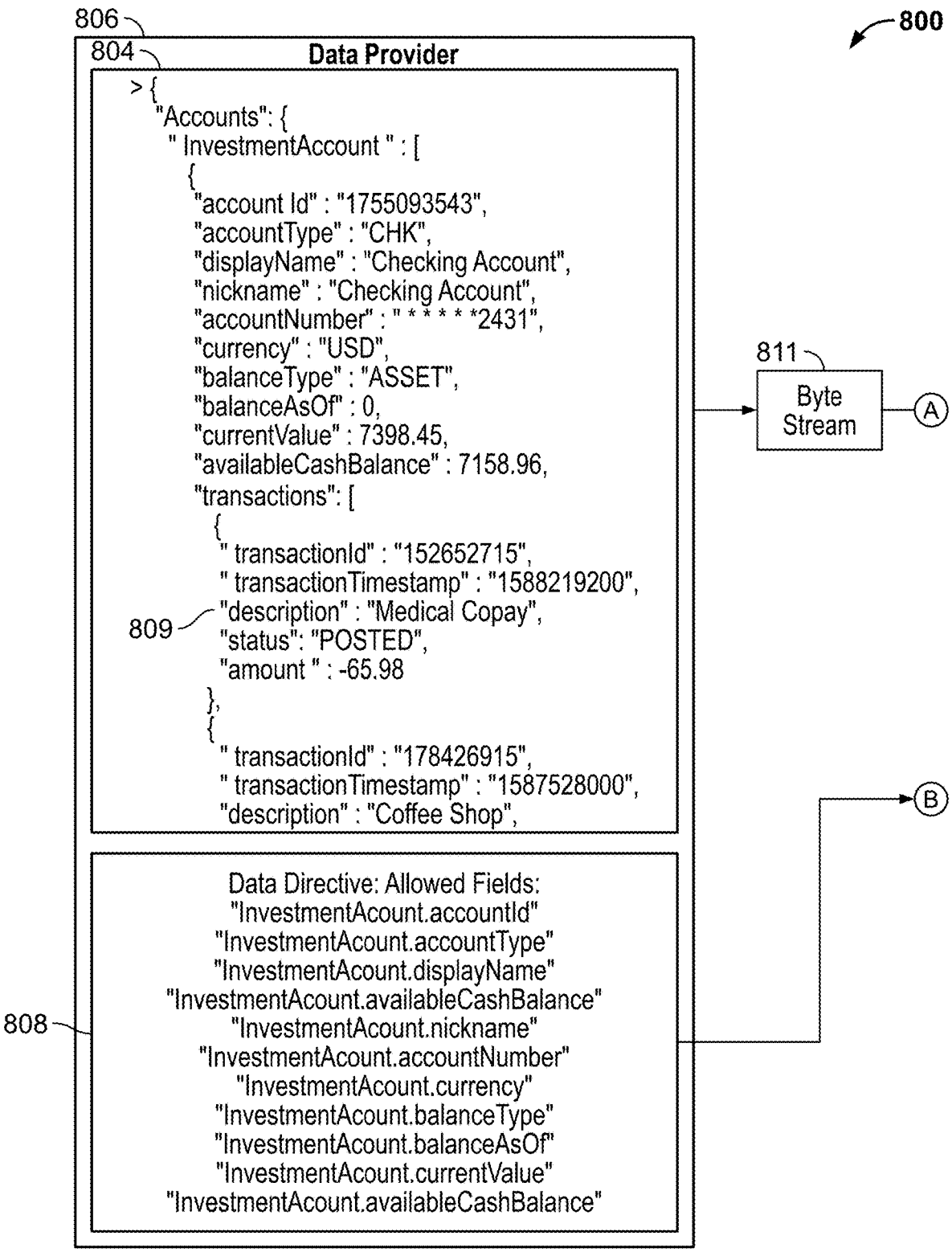
FIG. 8 shows a block diagram of an illustrative system for selectively providing data to a data recipient, in accordance with some embodiments of this disclosure.
Figure 8:
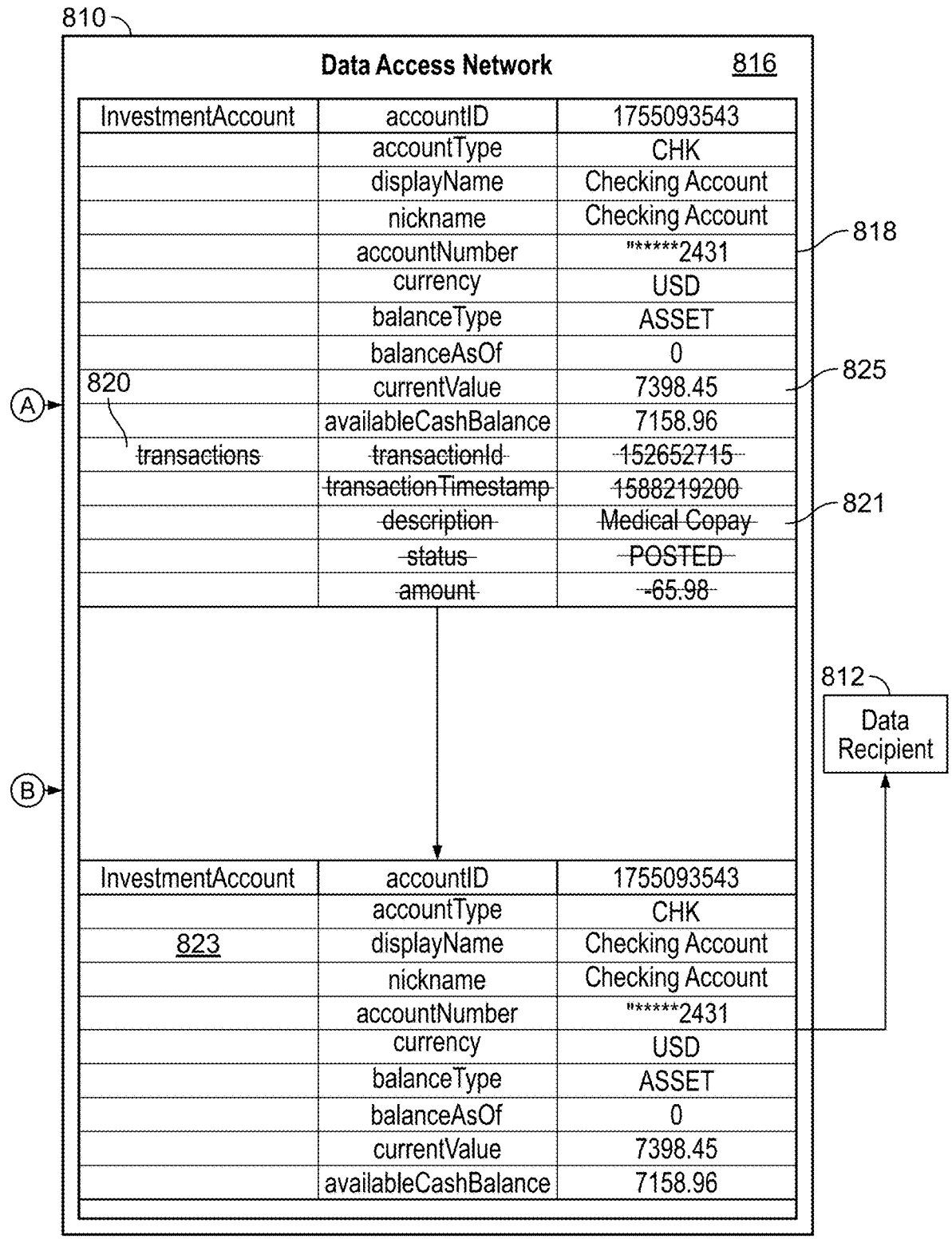

FIG. 8 shows a block diagram of an illustrative system 800 for selectively providing data to a data recipient, in accordance with some embodiments of this disclosure. Data access network 810 may receive from data provider 806 user data elements or data record 804 associated with a user (e.g., user 204 of FIG. 2) and data directive 808, which may correspond to which data items are permissible to provide to a particular data recipient 812 for this particular user (or any particular user) of data having one or more accounts or products with data provider 806. In some embodiments, data directive 808 may be received by data access network 810 in advance, e.g., prior to receiving user data 804, or data directive 808 may be received concurrently with user data 804. In some embodiments, data access network 810 may be configured to generate data directive 808 based on instructions received from data provider 806. In the example of FIG. 8, data elements 804 may relate to a checking account of a user with data provider 806, and more particularly to a medical copay made by a user, as indicated at data item 809. In some embodiments, data directive 808 may be provided in the format of parentelement.childelement, e.g., FieldA.FieldA1, where Field A1 is a child of parent field A.

The transfer of user data 804 from data provider 806 to data access network 810 may be caused in response to receiving an indication from a user desiring to share his or her data (e.g., stored in association with data provider 806) with data recipient 812. Based on such request, a data access API, which may be externally facing for use by data recipients to access user data, may communicate with data provider 806 to facilitate user data elements for a particular product (e.g., checking account or VISA account) to be sent to collector 726 of FIG. 7, where the data and its format may vary based on bank and product type. Such user data elements may be filtered by data access network 810 based on data directive 808, prior to being provided to data recipient 812. In some embodiments, data access network 810 may define and configure the attributes and fields of various accounts and account types from the various data providers 806, based on information received from data provider 806, in order to implement rules and entitlements of each data provider when providing data to data recipient 812. In some embodiments, data 804 may be stored in any suitable structured or semi-structured data format (e.g., JSON, XML).

User data 804 and/or data directive 808 may be transmitted from data provider 806 to data access network 810 in the form of a byte stream 811 over a communication channel (e.g., a wired or wireless connection), and byte stream 811 may correspond to a sequence of 8-bit portions of data flowing through the communication channel. In byte stream 811, plain text may be represented by a string of alphanumeric digits (e.g., 54 46 82 of aa a5 db b7 47 2e b2 50 61 75 4d 6d d8 b8 32).

Data access network 810, upon receiving byte stream 811, may convert byte stream 811 into objects of the data elements for transfer into buffer memory 729, in order to perform certain data operations, e.g., to facilitate and speed up filtering of user data. In some embodiments, the data objects transferred to transient buffer memory 729 may comprise a unique identifier and metadata in addition to the data elements themselves. Data access network 810 may generate, based on the data objects of such converted byte stream 811, key-value map structure 816 in buffer memory 729, where key-value map 816 may correspond to key-value map 716 of FIG. 7. Key-value map 816, e.g., an associative array or hash table, may be generated to hold, on a temporary or transient basis at buffer 729 of FIG. 7, a plurality of key-value pairs, where the key and the value may be linked such that the key may be a unique identifier indicative of a pointer to a location of a data item, and the value may correspond to such data item. While data item values 818 are shown as part of key-value map 816 in the example of FIG. 8, this is merely illustrative and key-value map 816 may store pointers to locations of data item values 818 in buffer memory 729.

Key-value map 816 may temporarily store user data elements in a hierarchical manner to store certain data fields at predefined memory locations (e.g., corresponding to a memory address of buffer memory 729) such that a memory location of certain data fields may be known and indexed. Thus, user data that complies with data directive 808, and user data that does not comply with data directive 808, may be identified using index key identifiers in key-value map 816 without having to process the entirety of the received chunk of user data, thereby reducing the time and processing power required to perform filtering of data. In some embodiments, processing time may be reduced from around 1 second to process an entire chunk of data in identifying unauthorized data items, to around 10 ms by employing key-value map 816 in identifying unauthorized data items. Data may be stored in key-value map 816 in any suitable format, e.g., JSON, XML, etc. In some embodiments, a particular data field (e.g., accountType) may consistently be stored in the same memory location (e.g., for a particular data provider) to enable the particular data field to be quickly identified or retrieved. Additionally or alternatively, data access network 810 may use information from various data providers 806 to optimize key-value map 816, e.g., data access network 810 may store data from different data providers in different ways based on how data access network 810 typically receives data from the data providers.

Data access network 810 may determine based on data directive 808 that certain data associated with transaction 820 is not permitted to be provided to data recipient for this particular data provider and/or user and/or product combination. For example, data directive 808 may only include permitted data fields and omit restricted data fields, or may specify only restricted data fields or only permitted data fields. In response to determining that data associated with unauthorized data elements (e.g., transactions 820) is present in the data received from data provider 806 but is not permitted by data directive 808, data access network 810 may delete (e.g., purge or remove of flush) data not permitted by data directive 808 by, e.g., clearing values of the data associated with transactions 820 (e.g., zeroing both the value and the key of the entries associated with transactions data 820). In some embodiments, data indicative of an unauthorized field may be used to replace and overwrite the data fields associated with transactions 820. In addition, filtered data elements (e.g., determined as permissive to transmit to data recipient 812) may be deleted immediately after transmission to data recipient 412 or within a predefined period of time after transmission (e.g., any appropriate or suitable amount of time, such as, for example, less than one second; less than thirty seconds; or less than one minute). Incoming data, e.g., for a next transaction, may be used to overwrite the filtered data in buffer memory 729, thereby permanently deleting (e.g., removing, purging, flushing) the filtered data and rendering it inaccessible. In some embodiments, a technique may be employed to reallocate the memory associated with the unauthorized fields to be used for other purposes, once the reference to a particular memory location is removed, deleted and/or purged.

In some embodiments, data directive 808 associated with data provider 806 may exclude certain data elements (e.g., transactions 820), based on such data element (e.g., transactions 820) including information 821 related to a medical copay made by a user. For example, such data element may be excluded due to being related to sensitive personal health information not suitable to be provided to, and potentially stored by, data recipient 812. Thus, data provider may be provided with balance information 825 but not transactions information 820 related to medical copay 821. In this way, data access network 810 may not only provide for filtering of data received from data provider 806 based on data directive 808, but may additionally provide for data security for the user by withholding certain sensitive personal information. In some embodiments, data provider 806 may not have provided data access network 810 a data directive for each potential scenario or use case of the user data. Data access network 810 may nonetheless store information indicating that for a particular data provider 806 and data recipient 812 combination, data recipient 812 is permitted access to certain information (e.g., bank account number) in all instances, but may never be permitted access to other information, and data access network 810 may take this information into account when providing user data to data recipient 812.

Data 823 may correspond to the remaining data fields that may be present after filtering is performed. In some embodiments, once the filtered data is obtained, data access network 810 may perform a check to ensure that no other data directives have been received from data provider 806, and may perform filtering if an intervening data directive is detected. Data access network 810 may convert data 823 into a format (e.g., JSON or XML) that is suitable for data recipient 812. In some embodiments, data access network 810 may consume data in any format, perform any suitable filtering on the data, and provide data in a suitable format to data recipient 812 on the downstream side. In some embodiments, data of byte stream 811 may flow encrypted into data access network 810, and data may be provided to data recipient 812 in an encrypted manner, where data may be encrypted and decrypted by respective parties using any suitable method (e.g., using private-public key pairs). In some embodiments, a header portion of data may indicate a type of data included in the payload, while the payload may be encrypted. In some embodiments, once data is transmitted to data recipient 812, data 823 may be removed from buffer memory 729 after a predefined period of time, and data access network 810 may only store identifiers or hash values for the data provider and the user (e.g., in order to log a transaction), where an identity of the user is not discernable based on the identifier or hash value. Data provided to data recipient 812 may be provided in the same format, or a different format, from a format of data 804. In some embodiments, rules and data directives received from data provider 806 may be dynamically applied to received user data one or more times per day (e.g., four times a day, based on how often a data provider provides updates to data directives).

In some embodiments, data access network 810 may perform filtering based on a specific product type (e.g., health savings accounts) for a particular data provider. For example, each data recipient desiring to obtain user information from data provider 806 may not be permitted to access any information related to the specific account, e.g., based on a global data directive associated with a data provider. In some embodiments, data recipient-specific data directives associated with a data provider may prohibit specific data recipients from accessing information for certain types of products or accounts of data provider 806. In some embodiments, data elements may be pre-filtered (e.g., based on the global data directive and/or the data recipient specific data directive and/or user selections associated with an authorized accounts selection database) by other components of data access network 810 and/or the associated data provider, prior to the generation of key-value map 816. In some embodiments, data access network 810 may request that data provided by data providers be in a specific format (e.g., account type and account ID in payload). In some embodiments, byte stream 811 may contain personally identifiable information, and such PII may be filtered out by data access network 810, e.g., based on data directive 808.

In some embodiments, data access network 810 may be configured to perform one or more of a variety of masking operations on data elements 804 received from data provider 806. For example, data provider 806 may instruct data access network (e.g., by way of data directive 808) to mask certain data elements, e.g., based on the identify of data recipient 812. For example, a predefined number of digits or characters of an account number may be masked (e.g., replaced with an asterisk or star character) such that only a subset of the digits are readable. In some embodiments, masking may be performed on data elements received in a particular format (e.g. JSON) to mask private information (e.g., social security numbers of a user). Such masking operation may be used by data access network 810 to perform the filtering operation. For example, any suitable syntax (*.accountId) may be used to specify that a particular data element (e.g., accountID) should be returned regardless of a parent element in which it is contained (e.g., InvestmentAccount). As another example, the masking operation may define the number of characters that should be exposed in the output, the masking character to be used, and the position within the data element where the masking should start (e.g., 4 digits from start or end of string). For example, the command of investmentAccount.accountNumber::mask (4,*,$) may mask all but the last four digits (e.g., *****2431) of the account number (12342431), and the command investmentAccount.accountNumber::mask(4,*,e) may mask all but the first four digits (e.g., 1234*****) of the account number (12342431). In some embodiments, an allow operation filter may be employed to filter out a parent element based on a value of the child element, e.g., the allow operation may accept a list of strings as parameters, and if the value of the child element is not one of the values in the list passed to allow operation, parent element may be removed from the payload. Such allow operation may be used for product filtering such that the allow list may contain the products or accounts allowed by a particular data provider, and if an account type is not an allowed product code, the whole account may be removed from the payload. For example, for the command: investmentAccount.account-Type::allow(I,checking) if a user has any account that does not belong to the list of products (I, checking), such accounts may be removed from the data.

Figure 9:
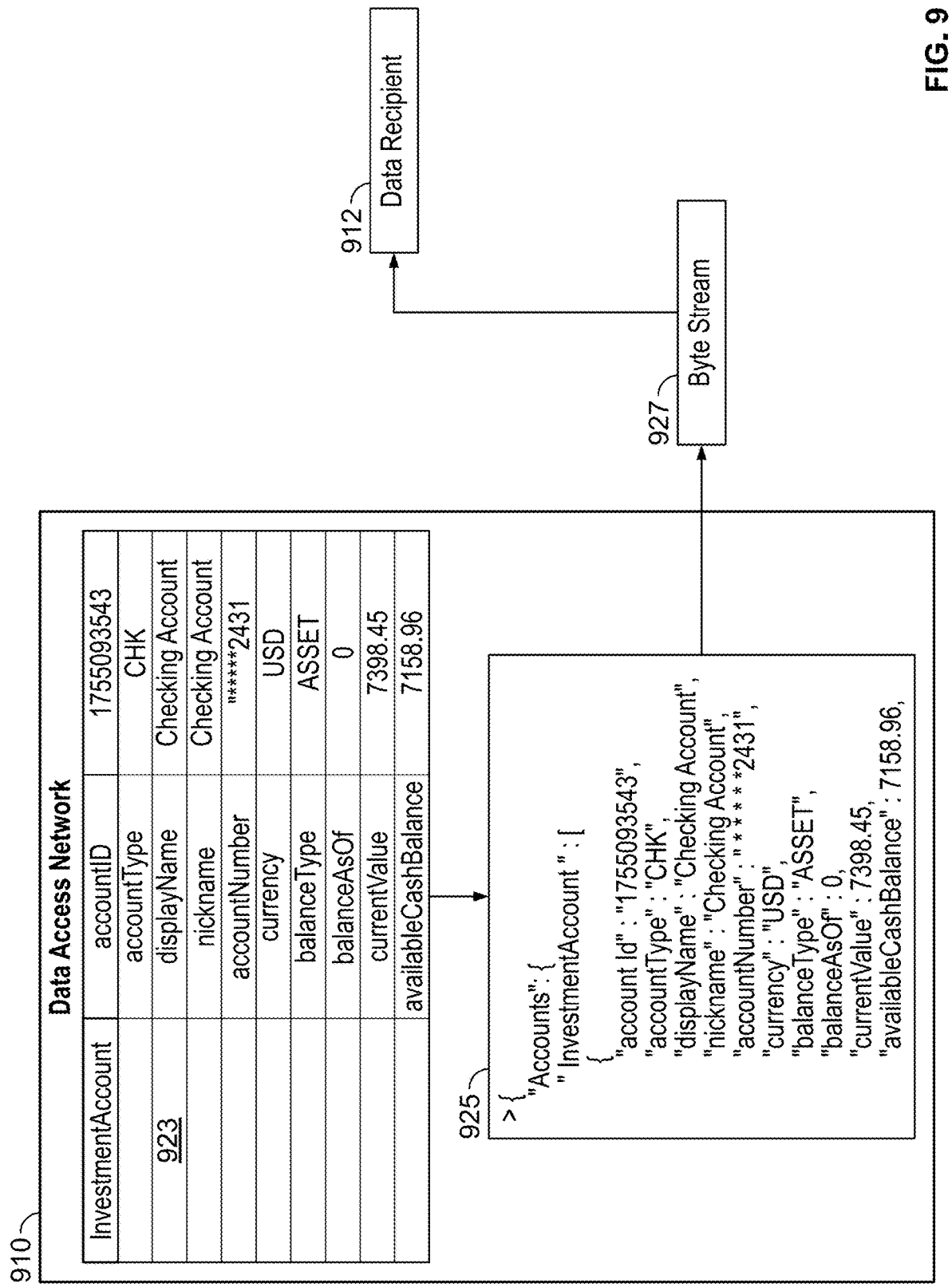
FIG. 9 shows a block diagram of an illustrative system for selectively providing data to a data recipient, in accordance with some embodiments of this disclosure.

FIG. 9 shows a block diagram of an illustrative system for selectively providing data to a data recipient, in accordance with some embodiments of this disclosure. Data access network 910 may convert filtered data 923, e.g., filtered based on data directive 808 of FIG. 8 received from data provider 806, into a data format 925 (e.g., JSON, XML, or other structured or semi-structed data format) suitable for data recipient 912. Converted filtered data associated with format 925 may be packaged into byte stream 927 for transmission to data recipient 912. Upon receiving byte stream 927, data recipient 912 may use convert byte stream 927 into a readable format and present user data represented by byte stream 927 to the user having requested to link his or her products or account with data provider 806 with data recipient 912.

Figure 10:
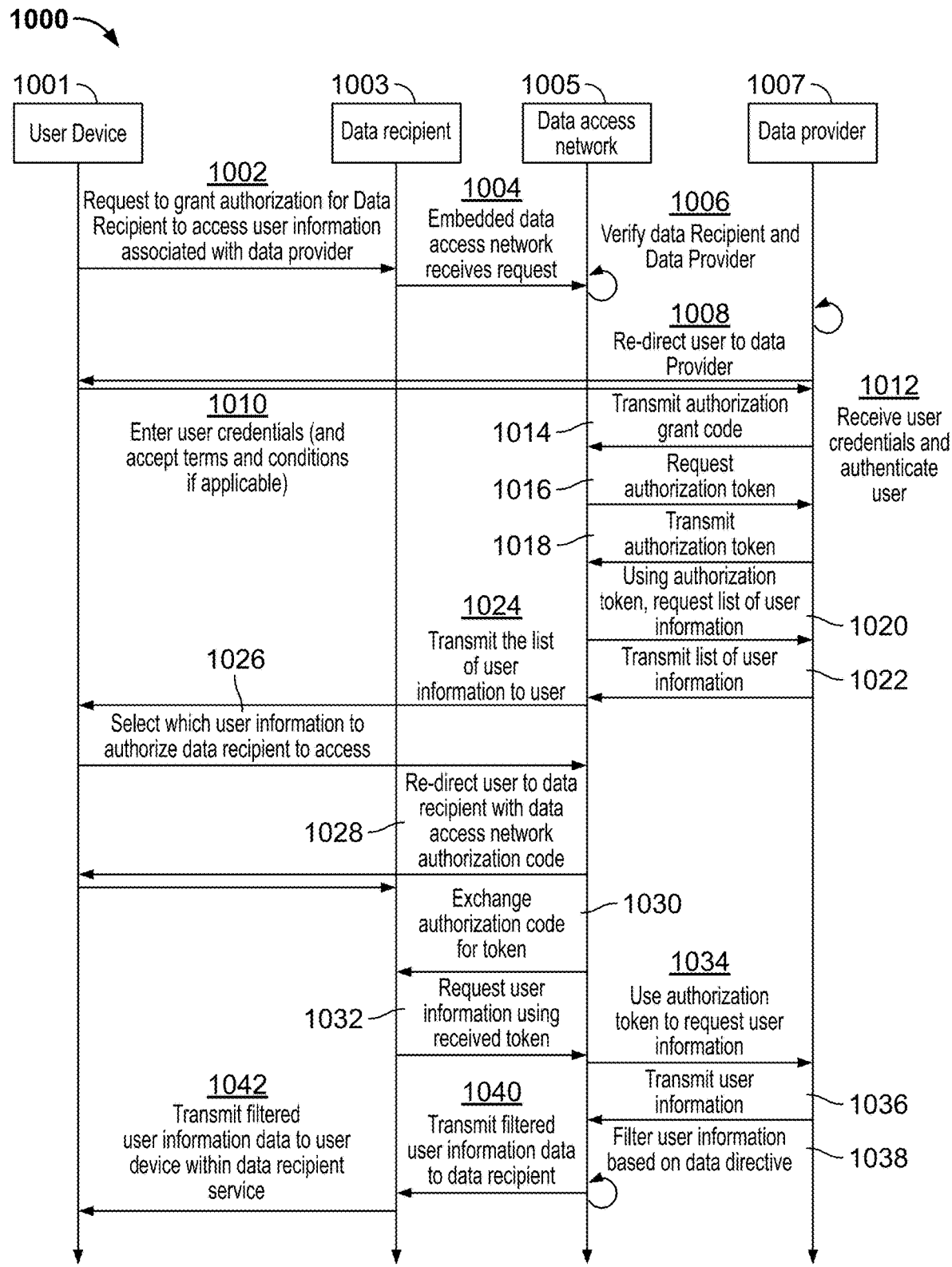
FIG. 10 is a flowchart of a detailed illustrative process for managing tokens for selectively providing data to a data recipient, in accordance with some embodiments of this disclosure.

FIG. 10 is a flowchart of a detailed illustrative process 1000 for managing tokens for selectively providing data to a data recipient, in accordance with some embodiments of this disclosure. In various embodiments, the individual steps of process 1000 may be implemented by one or more components of the devices and systems of FIGS. 1-9. Although the present disclosure may describe certain steps of process 1000 (and of other processes described herein) as being implemented by certain components of the devices and systems of FIGS. 1-9, this is for purposes of illustration only, and it should be understood that other components of the devices and systems of FIGS. 1-9 may implement those steps instead.

At 1002, user device 1001 may transmit, based on an indication from a user (e.g., user 204 of FIG. 2) a request to grant authorization for data recipient 1003 to access user information (e.g., user information 804) associated with data provider 1007. In some embodiments, the user information may correspond to financial information of user 204. User device 1001 may correspond to, e.g., one of computing device 118, 120, 122 of FIG. 1 of user 204.

At 1004, data access network 1005 may receive such request. In some embodiments, data access network 1005 may provide executable instructions (e.g., by way of a URL address) to instruct data recipient 1003 of a location to which to forward the request, or may otherwise receive the request from data recipient 1003. In some embodiments, data recipient 1003 may be, for example, a fintech organization that user 204 is interested in creating an account with or purchasing a product from, and data provider 1007 may be, for example, a financial institution (e.g., a bank) at which user 204 has an existing account, where certain information from the account of user 204 with data provider 1007 may be required to establish the account with data recipient 1003.

At 1006, data access network 1005 may perform a verification of each of data recipient 1003 and data provider 1007, e.g., to ensure that each of data recipient 1003 and data provider 1007 previously registered with data access network and that data recipient 1003 is authorized to receive data from data provider 1007. For example, data access network 1005 may reference one or more of databases 715, 717 to compare identifiers of data recipient 1003 and data provider 1007 to a list of authorized entities in performing such verifications.

At 1008, if data access network 1005 determines that each of data recipient 1003 and data provider 1007 is a verified entity with data access network 1005, data access network 1005 may re-direct the user operating user device 1001 to data provider 1007. For example, if user device 1001 is accessing data recipient 1003 via a web browser, data access network 1005 may cause the web browser to be re-directed to a website of data provider 1007, or if user device 1001 is accessing data recipient 1003 by way of a mobile application, data access network 1005 may cause the mobile application to launch the mobile application of data provider 1007 in place of (or within) the mobile application of data recipient 1003.

At 1010, user 204 operating user device 1001 may be prompted by an authenticator portion of a service (e.g., website or application) of data provider 706 to enter his or her credentials for his or her account with data provider 1007. User device 1001 may be configured to receive input of the user credentials in any suitable format (e.g., text, voice, tactile, biometric, or any combination thereof). In some embodiments, the user may be required to agree to certain terms and conditions associated with data provider 1007 and/or data access network 1005.

At 1012, data provider 1007 may receive the user credentials entered at user device 1010 and transmitted to data provider 1007, and determine whether the user credentials correspond to an authorized user of data provider 1012.

At 1014, in response to authenticating user 204 operating user device 1001, data provider 1007 may transmit an authorization grant code (e.g., authorization grant code 419 of FIG. 4) to data access network 1005. At 1016, data access network 1005 may use such authorization grant code received from data provider 1007 having authenticated user 204 in requesting an authentication token (e.g., authentication token 421 of FIG. 4) from data provider 1007. At 1018, data provider 1007 may provide the authorization token to data access network 1005, responsive to the request of 1016, and data access network 1005, at 1020, may request user information of the authenticated user 204 using such authentication token 421.

At 1022, data provider 1007 may transmit the requested list of user information (e.g., information related to checking account 422, savings account 424, basic savings account 426, money market account 428 of FIG. 4) to data access network 1005, which may in turn transmit such user information to user device 1001. At 1026, data access network may receive an indication from user device 1001 that user 204 desires to share certain user data (e.g., information related to checking account 422, savings account 424, basic savings account 426) with data recipient 1003, but does not wish to share other user data (e.g., information related to money market account 428) with data recipient 1003. Such indications may be received in the form of user selection (e.g., checking or unchecking respective boxes of the accounts of products included in the user information). In some embodiments, data access network may recommend which accounts to share, e.g., to help the user share no more than necessary with data recipient 1003. In some embodiments, data provider 1007 may directly transmit the user information to user device 1001, and receive user selection of one or more accounts or products to share with data recipient 1003 from user 204 of user device 1001.

At 1028, data access network 1005 may re-direct user device 1001 to the website or application associated with data recipient 1003 along with a data access network authorization grant code (e.g., grant code 434 of FIG. 4). In some embodiments, an indication may be presented (e.g., at interface 432) to the user by data recipient 1003 that the accounts or products specified at 1026 have been successfully linked. While the accounts may have been successfully linked, data recipient may nonetheless be required to request access to the user information by transmitting data access network authorization grant code (e.g., code 434 of FIG. 4) to data access network 1005.

At 1030, data access network 1005 may, responsive to receiving data access network authorization grant code from data recipient 1003, provide a token (e.g., a first data access identifier token 436) to data recipient 412. At 1032, data recipient 1003 may use the received token 436 to request permissioned user information (e.g., information related to checking account 422, savings account 424, basic savings account 426) of user 204 with data provider 1007.

At 1034, data access network 1005 may use authentication token 421, previously received from data provider 1007, to request the permissioned data of user 204 with data provider 1007 and having been requested by data recipient 1003 at 1032. At 1036, data access network 1005 may receive the permissioned user data from data provider 1007, after data provider verifies authentication token 421 received from data access network 1005.

At 1038, data access network 1005 may perform filtering of the permissioned user information of user 204 based on a data directive (e.g., data directive 808 of FIG. 8) of data provider 1007, as discussed in more detail in connection with FIG. 12. For example, based on data directive 808, data access network 1005 may convert user information received in the form of byte stream 811 into a key-value map data structure 816, and may remove data (e.g., related to transactions 820 and medical copay 821 of FIG. 8) that is not permitted to be sent to data recipient 1003 based on data directive 808.

At 1040, data access network 1005 may transmit filtered user information 823 to data recipient 1003, and at 1042, data recipient may in turn provide filtered user information 823 to user device 1001 for presentation within the service (e.g., application or website) of data recipient 1003.

Figure 11:
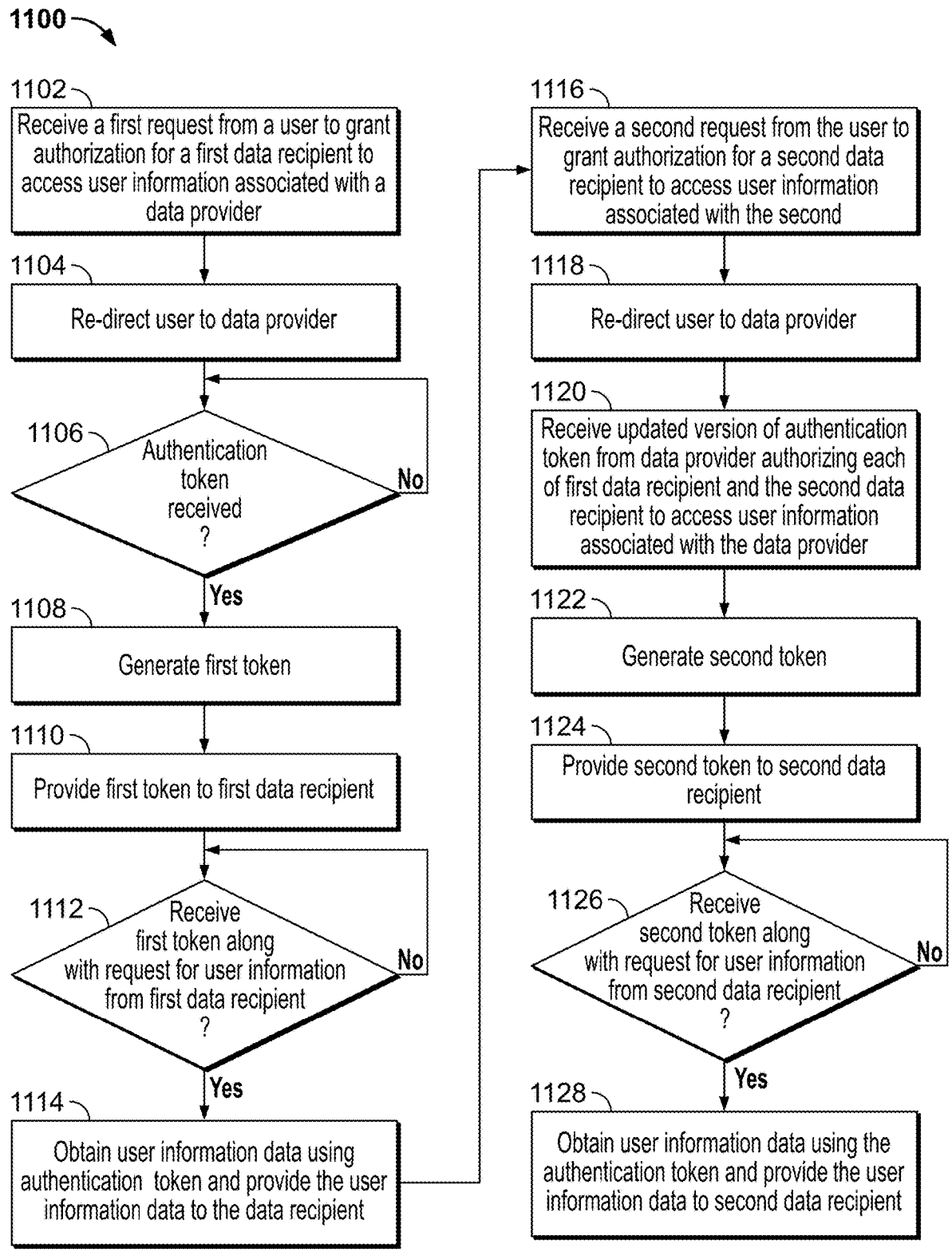
FIG. 11 is a flowchart of a detailed illustrative process for managing tokens for selectively providing data to multiple data recipients, in accordance with some embodiments of this disclosure.

FIG. 11 is a flowchart of a detailed illustrative process 1100 for managing tokens for selectively providing data to multiple data recipients, in accordance with some embodiments of this disclosure. In various embodiments, the individual steps of process 1100 may be implemented by one or more components of the devices and systems of FIGS. 1-9. Although the present disclosure may describe certain steps of process 1100 (and of other processes described herein) as being implemented by certain components of the devices and systems of FIGS. 1-9, this is for purposes of illustration only, and it should be understood that other components of the devices and systems of FIGS. 1-9 may implement those steps instead.

At 1102, the data access network (e.g., data access network 310 of FIG. 3) may receive a first request from user 204 of FIG. 2 to grant authorization for data recipient 312 of FIG. 3 to access user information (e.g., data elements 804 of FIG. 8) associated with a data provider 302 of FIG. 3. For example, user device 118 may be operated by user 204 to transmit the first request to data recipient 302, and data access network 310 may be configured to detect such request (e.g., by receiving an indication from data recipient 302, such as via a URL address provided by data access network 310 to data recipient 302) or otherwise notified or forwarded the first request. The first request may be based on a desire of user 204 to link his or her accounts or products with data provider 302 with a new or existing account with data recipient 302.

At 1104, data access network 310 may re-direct user 204 operating user device 118 to a service provided over network 102 by data provider 302, where data provider may prompt user 204 to enter his or her log-in credentials. In response to authenticating user 204 based on the received log-in credentials, data provider may transmit authentication token 421 of FIG. 4 to data access network 310.

At 1106, if authentication token 421 is received, data access network 310 may further receive user selection of which user data is to be shared with data recipient 302, and at 1008, generate first token 436 for data recipient 302 which may be indicative of the permissioned user data for data recipient 302.

At 1110, data access network 310 may provide first token 436 to data recipient 312, where data recipient 312 at 1112 may transmit first token 436 along with a request for the permissioned user information to data access network 310.

At 1114, data access network 310 may obtain the requested permissioned user information from data provider 302 using authentication token 421 previously received from data provider 302, perform filtering on such data as described in further detail in connection with FIG. 12, and provide such filtered user data to data recipient 312.

At 1116, data access network 310 may receive a second request from user 204, e.g., operating one of user device 118, 120, 122 to grant authorization for data recipient 314 to access user information associated with data provider 302. In some embodiments, the user information requested to be shared with data recipient 314 may be the same or different from the user information requested to be shared with data recipient 312.

At 1118, data access network 310 may re-direct user 204 operating one of user device 118, 120, 122 from the website or application of data recipient 314 (e.g., at which user 204 initiated the second request) to a website or application associated with data provider 302.

At 1120, in response to data provider 302 authenticating user 204, an updated version of authentication token 421 may be received by data access network 310 from data provider 302. For example, the updated version of authentication token 421 may be modified to include an indication that each of data recipient 312 and 314 are permitted to access certain user data associated with data provider 302.

At 1122, data access network 310 may generate a second token, based on data recipient 314 having been authorized to access user data of accounts or products of user 204 with data provider 302. The second token may be generated in response to data access network 310 receiving an indication that certain accounts or products have been selected that data recipient 314 is permitted to access (e.g., one or more of checking account 422, savings account 424, basic savings account 426, money market 428). In some embodiments, even if each of data recipient 312 and data recipient 314 is granted access to the same accounts or products, data access network 310 may nonetheless generate separate tokens for each of data recipient 312 and data recipient 314.

At 1124, data access network 310 may provide the generated second token to data recipient 314, and data recipient 314 may transmit such second token along with a request for user information back to data access network 310.

At 1126, if data access network 310 receives the second token along with the request for user information from data recipient 314, processing may proceed to 1128. At 1128, data access network 310 may obtain user information data using the authentication token and provide the user information data to data recipient 314. In some embodiments, data access network 310 may perform filtering of data based on a data directive of data provider 302 prior to providing such user information data to data recipient 314.

Figure 12:
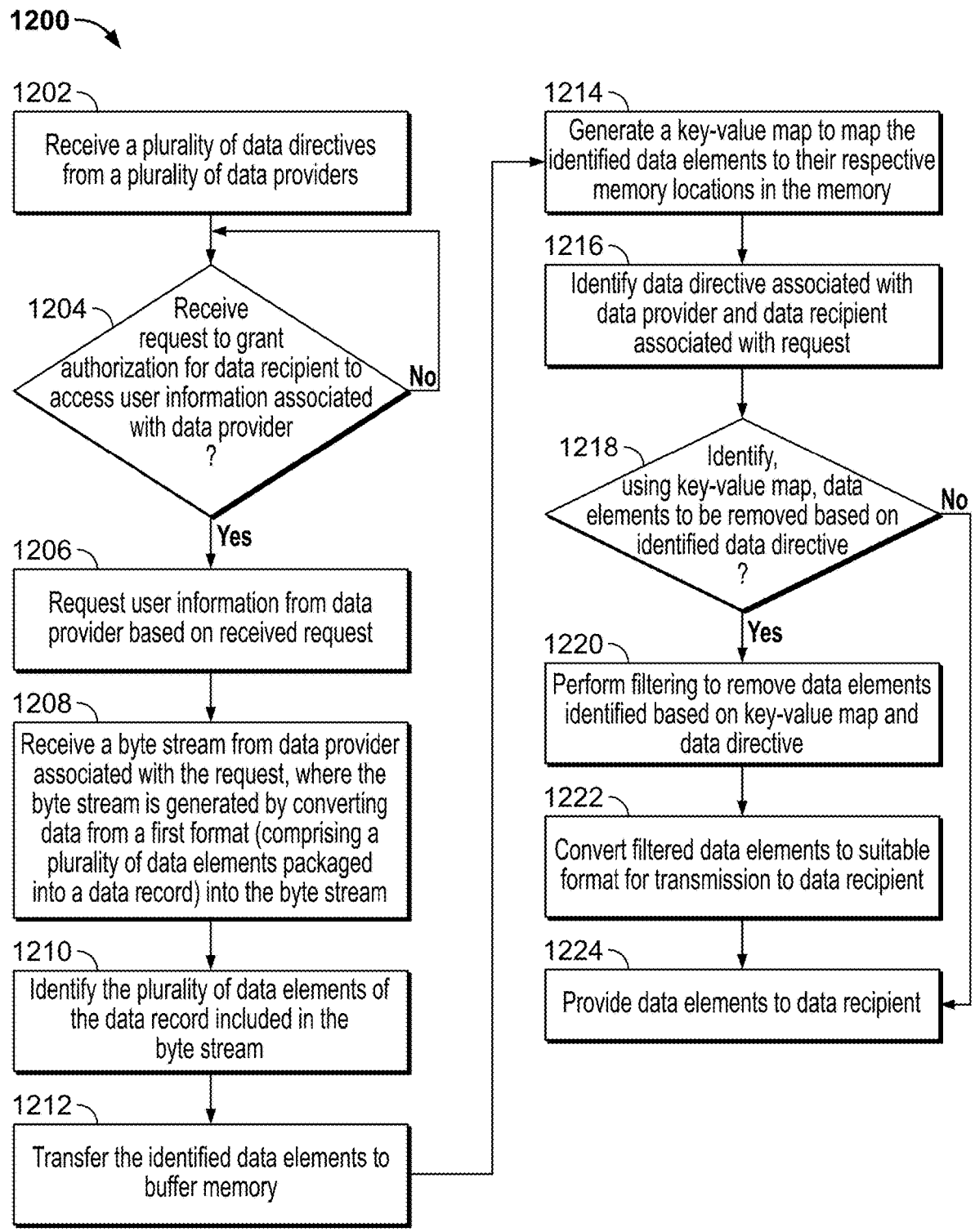
FIG. 12 is a flowchart of a detailed illustrative process for filtering data based on a data directive to selectively provide data to a data recipient, in accordance with some embodiments of this disclosure.

FIG. 12 is a flowchart of a detailed illustrative process for filtering data based on a data directive to selectively provide data to a data recipient, in accordance with some embodiments of this disclosure. In various embodiments, the individual steps of process 1200 may be implemented by one or more components of the devices and systems of FIGS. 1-9. Although the present disclosure may describe certain steps of process 1200 (and of other processes described herein) as being implemented by certain components of the devices and systems of FIGS. 1-9, this is for purposes of illustration only, and it should be understood that other components of the devices and systems of FIGS. 1-9 may implement those steps instead.

At 1202, data access network 810 may receive from one or more data providers 806 one or more data directives 808. In some embodiments, each data directive 808 may correspond to a particular use case or circumstance for a particular type of user with a particular data recipient. Additionally or alternatively, a data provider 806 may provide a generic data directive for each transaction with a particular data recipient.

At 1204, data access network 810 may receive a request to grant authorization for a data recipient 812 to access user information associated with data provider. For example, a user (e.g., user 204 of FIG. 2) accessing a website or application of data recipient 812 via a user device 118, 120, 122 may transmit a request to link his or her accounts with data provider 806 with data recipient 812.

At 1206, data access network 810 may request user information from data provider 806 based on received request. For example, such request may be transmitted after authenticating user 204 and receiving an authorization token from data provider 806.

At 1208, data access network 810, in response to transmitting the request to data provider 806 for the user information, may receive byte stream 811 from data provider 806. In some embodiments, byte stream 811 is generated by converting data from a first format (e.g., JSON or XML format) into byte stream 811. Such first format may comprise a plurality of data elements (e.g., the fields of "balanceType", "availableCashBalance" and corresponding values) packaged into data record 804 of FIG. 8.

At 1210, data access network 810 may identify the plurality of data elements of the data record included in byte stream 811. For example, data access network 810 may convert byte stream 811 into a set of objects (e.g., by parsing a JSON string corresponding to byte stream 811) and analyze the set of objects to identify (e.g., by way of processing circuitry 704) the various data elements (e.g., the fields of "balanceType", "availableCashBalance" and corresponding values) of data record 804. At 1212, data access network 810 may store the identified data elements converted to objects in buffer memory 729 of FIG. 7. In some embodiments, the data objects may be stored in a transitory manner in buffer memory 729 and may comprise a unique identifier and metadata in addition to the data itself.

At 1214, data access network 810 may generate a key-value map 816 to map the identified data elements to their respective memory locations in buffer memory 729. Such key-value map 816 may temporarily store user data in a hierarchical manner to store certain data fields at predefined memory locations (e.g., corresponding to a memory address of buffer memory 729) such that a memory location of certain data fields is known and indexed. In some embodiments, key-value map 816 may itself be a data object that holds key-value pairs, where the set of objects corresponding to the identified data elements may correspond to a key or value of key-value map 816.

At 1216, data access network 810 may identify data directive 808 associated with data provider 806 and data recipient 812 associated with the request received at 1204. For example, data access network 810 may determine that, based on the products or accounts selected by the user at GUI 423, and based on one or more attributes of data recipient 812 and how it intends to use the data, that data directive 808 is appropriate for this particular transaction.

At 1218, data access network 810 may determine, using key-value map 816, whether certain data elements are to be removed from the data record based on the identified data directive 808. For example, data access network 810 may determine that none of the data elements associated with transaction 820 are included in data directive 808 and thus are not permitted to be provided to data recipient 812. Key-value map 816 enables data access network 810 to ascertain the memory location of each of the prohibited data elements and perform filtering at 1220 to delete (e.g., purge and/or flush and/or remove) the prohibited data elements associated with transaction 820, thereby leaving only the permitted data elements in buffer memory 729. Data access network 810 may perform filtering in any suitable manner. In some embodiments, filtering may be performed based on storing data received from data provider 806 in a defined and structured manner, generating key-value map 816, comparing fields of key value map 816 to the permitted fields of data directive 808 to extract only permissible data, and packaging the extracted permissible data for transmission as up and sending as byte stream 927 of FIG. 9. In some embodiments, data access network 810 may perform filtering by removing or deleting or purging data fields, e.g., associated with transactions 820, from key-value map 816 that do not comply with data directive 808, such that the memory location of the unauthorized data is not identifiable. In some embodiments, data access network may, based on comparing fields of key value map 816 to the permitted fields of data directive 808, delete and/or overwrite the unauthorized data in memory.

At 1222, data access network 810 may convert filtered data elements 923 to a format 925 that is suitable for data recipient 912. For example, filtered data elements 923 may be converted to JSON or XML, format and subsequently converted into byte stream 927 for transmission to data recipient 912.

At 1224, data access network 810 may provide the filtered data elements 923 converted into the suitable format to data recipient 812. Data recipient 912 may present to user 204 the permissioned data elements, e.g., as shown at interface 438 of FIG. 4. In some embodiments, the filtered data elements may be stored for less than a predetermined period of time after transmission to data recipient 912 (e.g., one hour, 10 minutes, 5 minutes, 1 minute, 10 seconds, or 1 second) or may be immediately deleted (e.g., purged from memory, so as to render the data inaccessible) once the filtered data elements 823 are provided to data recipient 812. In some embodiments, the identified data elements may be stored without any personally identifiable information of user 204. For example, an identifier or hash may be assigned to the user and/or transaction.

Figure 13:
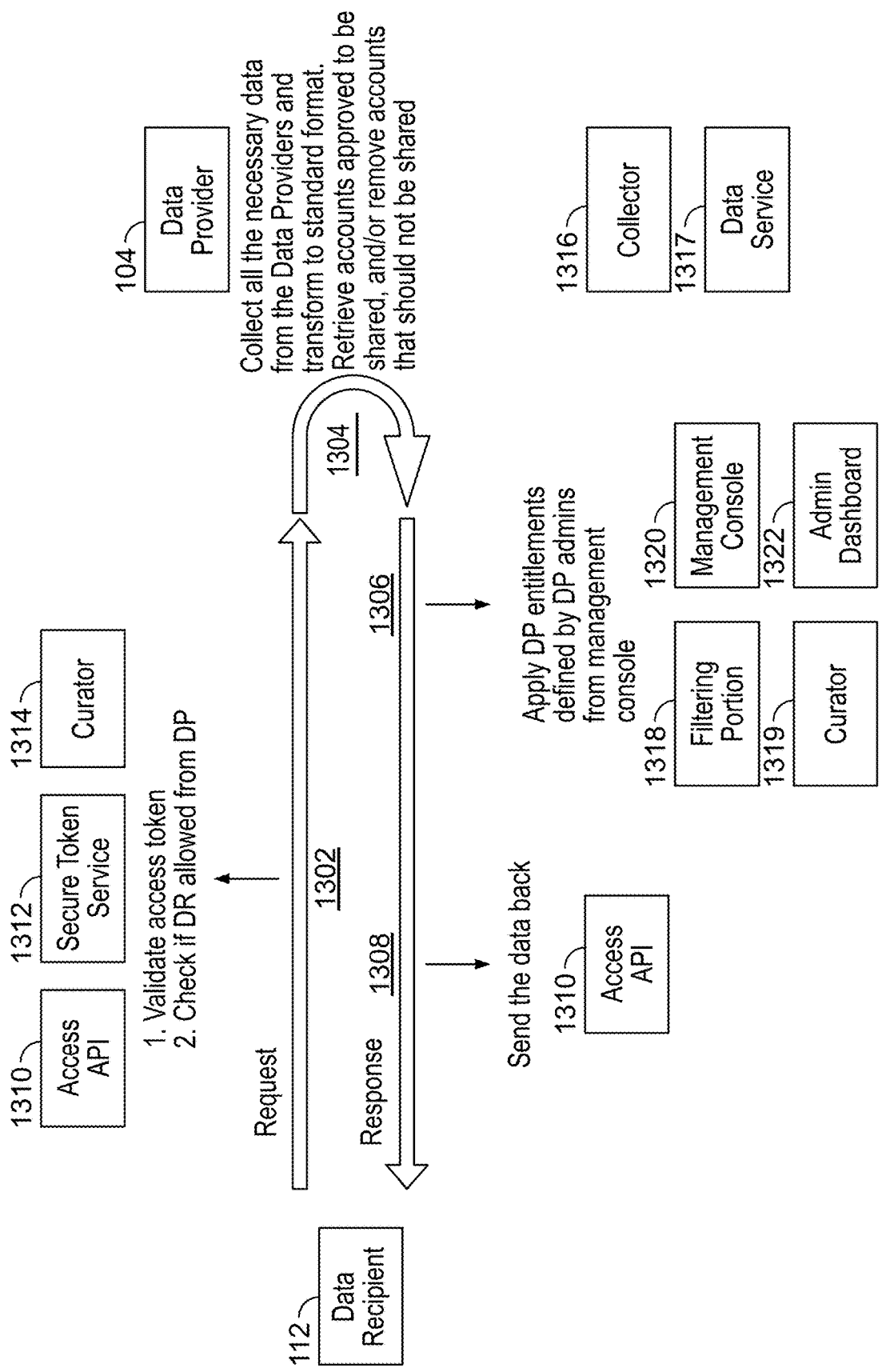
FIG. 13 is a flowchart of a detailed illustrative process for transmitting a package of authorized information to a data recipient, in accordance with some embodiments of this disclosure.

FIG. 13 is a flowchart of a detailed illustrative process 1300 for transmitting a package of authorized information to a data recipient, in accordance with some embodiments of this disclosure. In various embodiments, the individual steps of process 1300 may be implemented by one or more components of the devices and systems of FIGS. 1-9. Although the present disclosure may describe certain steps of process 1300 (and of other processes described herein) as being implemented by certain components of the devices and systems of FIGS. 1-9, this is for purposes of illustration only, and it should be understood that other components of the devices and systems of FIGS. 1-9 may implement those steps instead.

At 1302, data access network (e.g., data access network 810 of FIG. 8) may receive a request from a data recipient 112 to access information from data provider 104 associated with user 204 of FIG. 2. Such request may comprise a data recipient token (e.g., first data access identifier token 436 of FIG. 4). In some embodiments, data recipient 112 may have previously been authorized by the user, data provider 104 and data access network 810 to receive user information associated with data provider 104. In some embodiments, the request from data recipient 112 may be received by way of Access API 1310, e.g., an externally facing API used by data recipients to access user data (e.g., consumer financial data). In some embodiments, secure token service 1312 may be used to validate the data recipient token, and check whether data recipient 112 is permitted by data provider 104 to access user data, e.g., by querying curator 1319, which may store records of data providers, data provider products and accounts, and manage data recipient subscriptions to such provider products and accounts. Curator 1319 may correspond to curator 720 of FIG. 7.

At 1304, data access network 810 may collect the requested data from one or more data providers 106. In some embodiments, collector 1316 (which may correspond to collector 726) may be employed to standardize data from data provider 106 into a common format (e.g., FDX). In some embodiments, only accounts approved to be shared (e.g., by way of GUI 423 by user selection and permitted by data provider 106 to be shared for a particular data recipient product) may be retrieved, whereas accounts not permitted to be shared may be ignored for the purposes of the request received from data recipient 112. In some embodiments, data access network 810 may query data service 1317 (e.g., authorized accounts database), which may store a record of which accounts each user has authorized each data recipient to access.

At 1306, filtering portion 1318 (e.g., of data access network 810 described in connection with FIG. 8) may apply data provider directives, e.g., defined by data provider administrators by way of management console 1320, which may correspond to management console UI portion 740 of FIG. 7, to generate a package of authorized information based on the information received from data provider 106. In some embodiments, filtering portion 1318 may be employed in conjunction with curator 1319 and admin tool 1322 (which may correspond to admin dashboard 718 of FIG. 7) to apply the data provider directives. In some embodiments, admin tool 1322 may correspond to a tool to enable data access network 810 to specify data attributes that a data provider can provide to data access network 810, and may be used as an onboarding tool for data providers and/or to facilitate the connection of data providers and data recipients.

At 1308, data access network 810 may be configured to transmit the package of authorized information to data recipient 112, e.g., by way of Access API 1310. Such information may be usable by data recipient 112 to provide the user access to desired accounts, products or services provided by the data recipient 112 platform.

Figure 14:
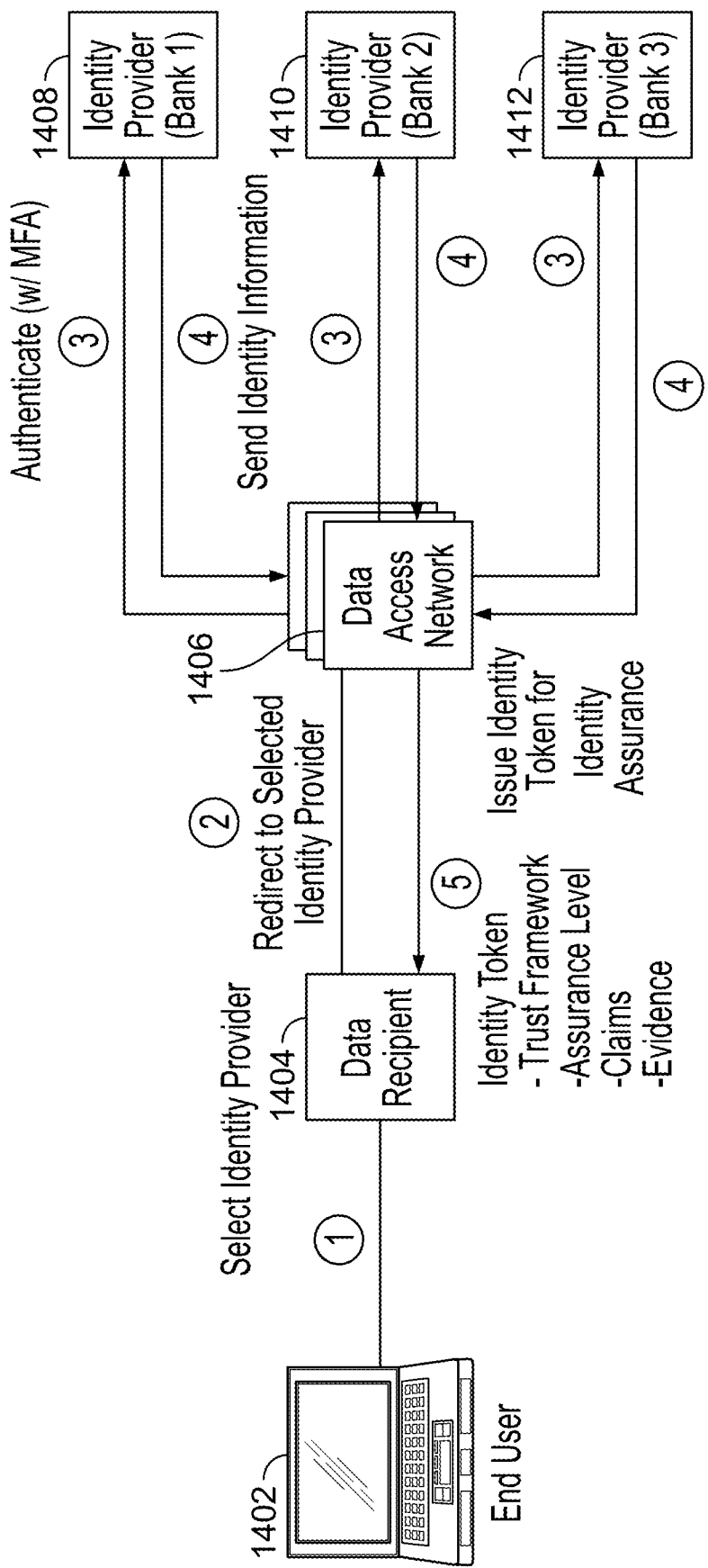
FIG. 14 is a flowchart of a detailed illustrative process for generating an identity token, in accordance with some embodiments of this disclosure.

FIG. 14 is a flowchart of a detailed illustrative process 1400 for generating an identity token, in accordance with some embodiments of this disclosure. In various embodiments, the individual steps of process 1400 may be implemented by one or more components of the devices and systems of FIGS. 1-9. Although the present disclosure may describe certain steps of process 1400 (and of other processes described herein) as being implemented by certain components of the devices and systems of FIGS. 1-9, this is for purposes of illustration only, and it should be understood that other components of the devices and systems of FIGS. 1-9 may implement those steps instead.

As shown in FIG. 14, end user 1402 may request to share his or her account or product information from one or more of data provider 1408, 1410, 1412 (e.g., banks, which may play a role as an identity provider to enable generation of an identity token of a user) with data recipient 1404. Data recipient may desire detailed personal information (e.g., social security number, full name, address, date of birth, etc.) of end user 1402 in order to set up an account for end user 1402 (e.g., associated with a mortgage application).

Data access network 1406 may receive the request initiated by end user 1402, to link his or her account data with data provider 1408 with data recipient 1404. In some embodiments, data access network 1406 may provide executable code to data recipient 1404 (e.g., contained in a URL address) that is executable to re-direct a browser or application of data recipient 1404 being access by user 1402 to data access network 1406, which may in turn cause the user session to be forwarded to data provider 1408. Data provider may perform an authentication process to authenticate end user 1402. In some embodiments, multi-factor authentication techniques may be utilized (e.g., requiring entry of a password associated with data provider 1408, as well as entry of a pin code received via SMS or email associated with the user account with data provider 1408).

If end user 1402 is successfully authenticated at data provider 1408, data access network 1406 may be provided with a token (e.g., indicative of identifying information of end user 1402), and data access network 1406 may generate an identity token comprising the identifying information of end user 1402. In some embodiments, token 436 (e.g., a first data access identifier token associated with a first data recipient) and/or a second data access identifier token associated with a second data recipient, as discussed in connection with FIG. 4, may be updated or enriched to include such identity token embedded therein. In some embodiments, the identity token may be generated in advance by data access network 1406 and persistently stored (e.g., in storage 710 of data access network server 702), based on information received from data provider 1408, e.g., prior to receiving user request to share user information with data recipient 1404 from the user's account with data provider 1408. In some embodiments, the generating of the identity token may be performed in response to receiving the user request to share user information with data recipient 1404 from the user's account with data provider 1408.

Once the identity token is generated by data access network 1406, the identity token may be forwarded to data recipient 1404, which may in turn validate end user 1402 on its platform. In some embodiments, the identity token may be usable by data recipient 1404 to automatically populate information fields of one or more sign up screens of a desired product or account of data recipient 1404, and validate end user 1402. The identity token may provide assurance and evidence for data recipient 1404, as part of a trust framework with data access network 1406 and data provider 1408, of the authenticity of the user's identifying information, and proof of the identity of end user 1402.

In some embodiments, the generated identity token may be transmitted to other data recipients requesting identifying information of end user 1402 in connection with products or accounts of end user 1402 with data provider 1408. In some embodiments, the identifying information of end user 1402 may be received by data access network 1406 in masked or encrypted form. In some embodiments, since identifying information of user 1402 may differ from data provider to data provider (e.g., data provider 1408 may have on record different information for user 1402 than does data provider 1410), each data provider may request data access network 1406 to generate a respective identity token for the corresponding data provider. In some embodiments, identifying information of user 1402 in the generated identity token may be deleted or removed by data access network 1406 once the user is verified at data recipient 1404.

While the examples of above have been described with reference to filtering data to be provided from a financial instruction (e.g., a bank) to a fintech service, it should be appreciated that the described systems and methods can be employed in any number of contexts or scenarios. For example, the described data access network may be employed to make decisions on whether an individual should be approved for a mortgage, based on criteria provided by a mortgage lender and mortgage loan applicant information provided by a mortgage loan applicant, without requiring the mortgage loan applicant to provide the mortgage lender with personally identifiable information, and the data access network may remove data related to the transaction after a predetermined period of time (e.g., a 90 day time window, or a one day time window). For example, data provided to the mortgage lender may be filtered to only provide relevant data to the transaction, e.g., the mortgage lender may only need information regarding large cash inflows or outflows into or out of an applicant's bank account within a predefined time period prior to the transaction (e.g., one month), but information related to the applicant's mutual fund positions may be deemed unnecessary and filtered out of the information provided to the mortgage lender. That is, the data access network may provide to the mortgage lender only the information that is needed to process the application of the loan applicant.

It should be appreciated that the above-described systems and methods may be used in different contexts and for different types of information. For example, the described data access network may be employed in healthcare, education, government, etc., or any other context where it may be beneficial to withhold certain information (e.g., a social security number included in a particular document) and provide a subset of such information (e.g., a GPA of a student included in the particular document) to a data recipient.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at an intermediary entity, a token from a data provider that enables access to a user's data at the data provider, wherein the token is received without the intermediary entity receiving user credentials;
   receiving, at the intermediary entity, a request from a data recipient to receive data from the data provider, wherein the token is required to access the data;
   receiving, at the intermediary entity, data from the data provider using the token;
   filtering, by the intermediary entity, the received data, based on a data directive associated with the data provider, to identify which data the data recipient is permitted to access; and
   providing, by the intermediary entity, the identified data to the data recipient.

2. The method of claim 1, wherein the token is stored by the intermediary entity without any personally identifiable information of the user.

3. The method of claim 1, further comprising:
   requesting, by the intermediary entity and using the token, a list of accounts or products that the user has with the data provider;
   receiving, at the intermediary entity, the list of accounts or products from the data provider; and
   causing, by the intermediary entity, a graphical user interface to be generated for display, wherein the graphical user interface comprises:
      the list of accounts or products that the user has with the data provider; and
      a selectable option, for each of the accounts or products, to selectively share with the data recipient data associated with respective accounts or products of the user with the data provider.

4. The method of claim 1, wherein executable instructions of the intermediary entity are executable to re-direct the user from a web page or application associated with the data recipient to the data provider.

5. The method of claim 1, wherein receiving at the intermediary entity the token from the data provider that enables access to the user's data at the data provider comprises:
   receiving, at the intermediary entity, an authorization grant code from the data provider; and
   in response to receiving the authorization grant code from the data provider, requesting, by the intermediary entity, the token from the data provider.

6. The method of claim 1, wherein receiving at the intermediary entity the token from the data provider that enables access to the user's data at the data provider comprises:
   receiving, at the intermediary entity, a request to grant authorization for the data recipient to access data associated with the data provider, wherein the request is initiated by the user interacting with a service associated with the data recipient; and
   in response to receiving the request, re-directing, by the intermediary entity, the user from the service associated with the data recipient to an authenticator associated with the data provider.

7. The method of claim 1, wherein filtering the received data is further performed based on a key-value map that is generated by the intermediary entity to map the identified data to their respective memory locations in memory of the intermediary entity.

8. The method of claim 1, wherein filtering the received data, based on the data directive associated with the data provider, to identify which data the data recipient is permitted to access comprises:
   transferring the data received from the data provider to a temporary buffer memory for processing.

9. The method of claim 8, wherein the identified data is deleted from temporary buffer memory by the intermediary entity in response to performing the filtering.

10. The method of claim 1, further comprising:
    receiving, at the intermediary entity, the data directive from the data provider in advance, wherein the data directive specifies which data is permitted to be provided to the data recipient.

11. A system comprising:
    hardware input/output (I/O) circuitry configured to:
       receive at an intermediary entity a token from a data provider that enables access to a user's data at a data provider, wherein the token is received without the intermediary entity receiving user credentials;
       receive a request from a data recipient to receive data from the data provider, wherein the token is required to access the data; and
       receive data from the data provider using the token; and
    hardware processing circuitry configured to:
       filter the received data, based on a data directive associated with the data provider, to identify which data the data recipient is permitted to access; and
       provide the identified data to the data recipient.

12. The system of claim 11, wherein the hardware processing circuitry is configured to store the received token without any personally identifiable information of the user.

13. The system of claim 11, wherein:
    the hardware processing circuitry is further configured to request, by the intermediary entity and using the token, a list of accounts or products that the user has with the data provider;
    the hardware I/O circuitry is configured to receive the list of accounts or products from the data provider; and
    the hardware processing circuitry is further configured to cause a graphical user interface to be generated for display, wherein the graphical user interface comprises:
       the list of accounts or products that the user has with the data provider; and
       a selectable option, for each of the accounts or products, to selectively share with the data recipient data associated with respective accounts or products of the user with the data provider.

14. The system of claim 11, wherein executable instructions of the intermediary entity are executable to re-direct the user from a web page or application associated with the data recipient to the data provider.

15. The system of claim 11, wherein the hardware I/O circuitry is configured to receive at the intermediary entity the token from the data provider that enables access to the user's data at the data provider by:
    receiving an authorization grant code from the data provider; and
    in response to receiving the authorization grant code from the data provider, requesting the token from the data provider.

16. The system of claim 11, wherein the hardware I/O circuitry is configured to receive, at the intermediary entity, the token from the data provider that enables access to the user's data at the data provider by:

receiving a request to grant authorization for the data recipient to access data associated with the data provider, wherein the request is initiated by the user interacting with a service associated with the data recipient; and in response to receiving the request, re-directing the user from the service associated with the data recipient to an authenticator associated with the data provider.

17. The system of claim 11, wherein the hardware processing circuitry is configured to filter the received data based on a key-value map that is generated by the intermediary entity to map the identified data to their respective memory locations in memory of the intermediary entity.

18. The system of claim 11, wherein the hardware processing circuitry is configured to filter the received data, based on the data directive associated with the data provider, to identify which data the data recipient is permitted to access by:

transferring the data received from the data provider to a temporary buffer memory for processing.

19. The system of claim 18, wherein the hardware processing circuitry is configured to delete the identified data from the temporary buffer memory in response to performing the filtering.

20. A non-transitory computer-readable medium having non-transitory computer-readable instructions encoded thereon that, when executed by a processor, causes the processor to:

receive at an intermediary entity a token from a data provider that enables access to a user's data at a data provider, wherein the token is received without the intermediary entity receiving user credentials;

receive a request from a data recipient to receive data from the data provider, wherein the token is required to access the data;

receive data from the data provider using the token;

filter the received data, based on a data directive associated with the data provider, to identify which data the data recipient is permitted to access; and provide the identified data to the data recipient.

* * * * *